US012666021B2

(12) United States Patent
Zhang et al.

(10) Patent No.: US 12,666,021 B2
(45) Date of Patent: Jun. 23, 2026

(54) DETERMINING REGIONS OF INTEREST USING LEARNED IMAGE CODEC FOR MACHINES

(71) Applicant: Nokia Technologies Oy, Espoo (FI)

(72) Inventors: Honglei Zhang, Tampere (FI);
Francesco Cricrì, Tampere (FI);
Alireza Aminlou, Tampere (FI); Miska Matias Hannuksela, Tampere (FI);
Nam Hai Le, Tampere (FI); Jukka Ilari Ahonen, Tampere (FI); Hamed Rezazadegan Tavakoli, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/640,520

(22) Filed: Apr. 19, 2024

(65) Prior Publication Data

US 2024/0357104 A1 Oct. 24, 2024

Related U.S. Application Data

(60) Provisional application No. 63/497,524, filed on Apr. 21, 2023.

(51) Int. Cl.
| | |
|---|---|
| *H04N 19/119* | (2014.01) |
| *H04N 19/124* | (2014.01) |
| *H04N 19/154* | (2014.01) |
| *H04N 19/167* | (2014.01) |
| *H04N 19/176* | (2014.01) |

(52) U.S. Cl.
CPC ......... *H04N 19/119* (2014.11); *H04N 19/167* (2014.11); *H04N 19/176* (2014.11); *H04N 19/124* (2014.11); *H04N 19/154* (2014.11)

(58) Field of Classification Search
None
See application file for complete search history.

(56) References Cited

U.S. PATENT DOCUMENTS

| | | | | |
|---|---|---|---|---|
| 7,953,251 B1 * | 5/2011 | Steinberg | ................. | G06T 5/94 |
| | | | | 382/117 |
| 9,292,729 B2 * | 3/2016 | Guthrie | ............... | G06V 10/426 |

(Continued)

FOREIGN PATENT DOCUMENTS

| | | | | | |
|---|---|---|---|---|---|
| CN | 108986080 B | * | 2/2021 | ............. | G06T 7/136 |
| CN | 113343987 B | * | 8/2023 | ............. | G06F 18/24 |

(Continued)

OTHER PUBLICATIONS

"Video coding for low bit rate communication", Series H: Audiovisual and Multimedia Systems, Infrastructure of audiovisual services—Coding of moving video, Recommendation ITU-T H.263, Jan. 2005, 226 pages.

(Continued)

*Primary Examiner* — Mohammed Jebari
(74) *Attorney, Agent, or Firm* — Nokia Technologies Oy

(57) ABSTRACT

Various embodiments describe an apparatus, a method, and a computer program product. An example apparatus includes at least one processor; and at least one memory storing instructions that, when executed by the at least one processor, cause the apparatus at least to perform: encoding an input picture by using a first encoder or first encoding parameters; encoding the input picture by using a second encoder or second encoding parameters; generating a first reconstructed picture based on the encoding of the input picture by using the first encoder or the first encoding parameters; and generating a second reconstructed picture based on the encoding of the input picture by using the second encoder or the second encoding parameters.

17 Claims, 8 Drawing Sheets

(56) References Cited

U.S. PATENT DOCUMENTS

| | | | | |
|---|---|---|---|---|
| 9,292,743 | B1 * | 3/2016 | Maali | G06V 20/52 |
| 10,198,823 | B1 * | 2/2019 | Agrawal | G06T 7/194 |
| 10,897,558 | B1 * | 1/2021 | Sun | G06T 5/20 |
| 2004/0264793 | A1 * | 12/2004 | Okubo | H04N 1/41 |
| | | | | 382/173 |
| 2008/0019587 | A1 * | 1/2008 | Wilensky | G06T 7/162 |
| | | | | 382/173 |
| 2009/0110299 | A1 * | 4/2009 | Panahpour Tehrani | |
| | | | | G06T 7/277 |
| | | | | 382/224 |
| 2012/0303615 | A1 * | 11/2012 | Goswami | G06V 10/507 |
| | | | | 707/723 |
| 2014/0153829 | A1 * | 6/2014 | Pham | G06T 7/194 |
| | | | | 382/173 |
| 2016/0189388 | A1 * | 6/2016 | Gupta | G06T 7/187 |
| | | | | 382/180 |
| 2017/0244976 | A1 * | 8/2017 | Taylor, II | H04N 19/198 |
| 2018/0007381 | A1 * | 1/2018 | Sclar | G06T 9/002 |
| 2018/0082130 | A1 * | 3/2018 | Saitwal | G06T 7/11 |
| 2018/0357467 | A1 * | 12/2018 | Tai | G06V 40/1347 |
| 2019/0180454 | A1 * | 6/2019 | Choudhury | H04N 19/139 |
| 2020/0279406 | A1 * | 9/2020 | Vosoughi | H04N 19/91 |
| 2022/0188991 | A1 * | 6/2022 | Chopra | G06T 7/0002 |
| 2023/0112309 | A1 | 4/2023 | Hannuksela et al. | |
| 2024/0005483 | A1 * | 1/2024 | Noble | G06T 7/0012 |
| 2024/0257445 | A1 * | 8/2024 | Holzer | G06F 9/453 |
| 2024/0267481 | A1 * | 8/2024 | Holzer | G06V 10/22 |
| 2025/0272945 | A1 * | 8/2025 | Zhu | G06V 10/806 |

FOREIGN PATENT DOCUMENTS

| | | | | |
|---|---|---|---|---|
| JP | 5453215 | B2 | * | 3/2014 |
| JP | 6008826 | B2 | * | 10/2016 |
| WO | 2022/167977 | A1 | | 8/2022 |

OTHER PUBLICATIONS

"Advanced video coding for generic audiovisual services", Series H: Audiovisual and Multimedia Systems, Infrastructure of audio-visual services—Coding of moving video, Recommendation ITU-T H.264, Aug. 2021, 844 pages.

"High efficiency video coding", Series H: Audiovisual and Multimedia Systems, Infrastructure of audiovisual services—Coding of moving video, Recommendation ITU-T H.265, Aug. 2021, 716 pages.

"Versatile video coding", Series H: Audiovisual and Multimedia Systems, Infrastructure of audiovisual services—Coding of moving video, Recommendation ITU-T H.266, Apr. 2022, 536 pages.

"Versatile supplemental enhancement information messages for coded video bitstreams", Series H: Audiovisual and Multimedia Systems, Infrastructure of audiovisual services—Coding of moving video, Recommendation ITU-T H.274, May 2022, 110 pages.

Mccarthy et al., "Additional SEI messages for VSEI (Draft 3)", Joint Video Experts Team (JVET) of ITU-T SG 16 WP 3 and ISO/IEC JTC 1/SC 29, JVET-AB2006-v1, 28th Meeting, Oct. 20-28, 2022, pp. 1-22.

"Information technology—Multimedia content description interface—Part 17: Compression of neural networks for multimedia content description and analysis", ISO 15938-17, 83 pages.

"Information technology—Generic coding of moving pictures and associated audio information: Systems", Series H: Audiovisual and Multimedia Systems, Infrastructure of audiovisual services—Transmission multiplexing and synchronization, Recommendation ITU-T H.222.0, Jun. 2021, 340 pages.

"Information technology—Generic coding of moving pictures and associated audio information: Video", Series H: Audiovisual and Multimedia Systems, Infrastructure of audiovisual services—Coding of moving video, Recommendation ITU-T H.262, Feb. 2000, 220 pages.

"Information technology—Universal coded character set (UCS)", ISO/IEC 10646, Sixth edition, Dec. 2020, 15 pages.

"Parameter values for ultra-high definition television systems for production and international programme exchange", Recommendation ITU-R BT.2020-2, Oct. 2015, 8 pages.

"Parameter values for the HDTV standards for production and international programme exchange", Recommendation ITU-R BT.709-6, Jun. 2015, 19 pages.

Hannuksela, "AHG8: Single-layer scalability approach", Joint Video Experts Team (JVET) of ITU-T SG 16 WP 3 and ISO/IEC JTC 1/SC 29/WG 11, JVET-O1150, 15th Meeting, Jul. 3-12, 2019, pp. 1-5.

* cited by examiner

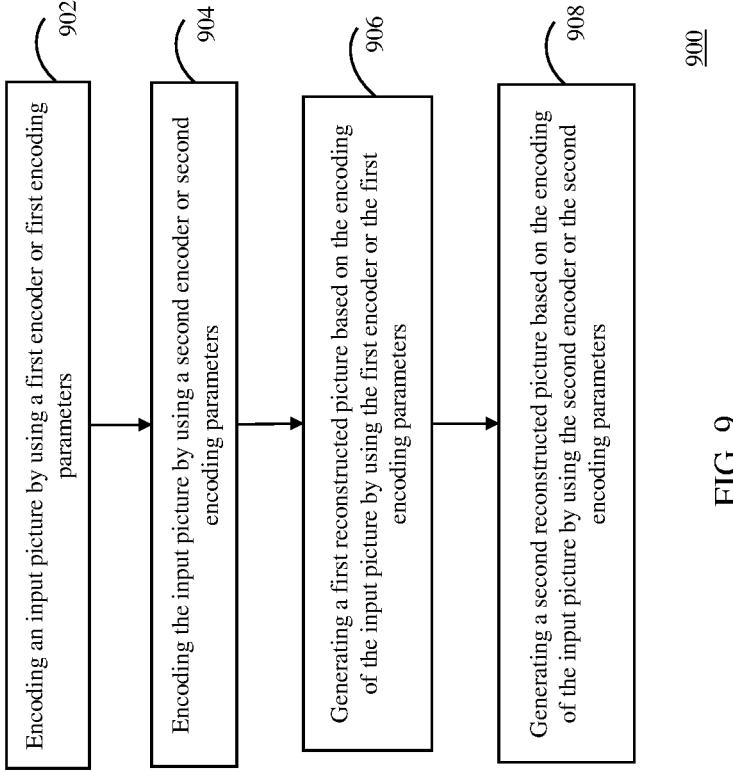

Encoding an input picture by using a first encoder or first encoding parameters 902

Encoding the input picture by using a second encoder or second encoding parameters 904

Generating a first reconstructed picture based on the encoding of the input picture by using the first encoder or the first encoding parameters 906

Generating a second reconstructed picture based on the encoding of the input picture by using the second encoder or the second encoding parameters 908

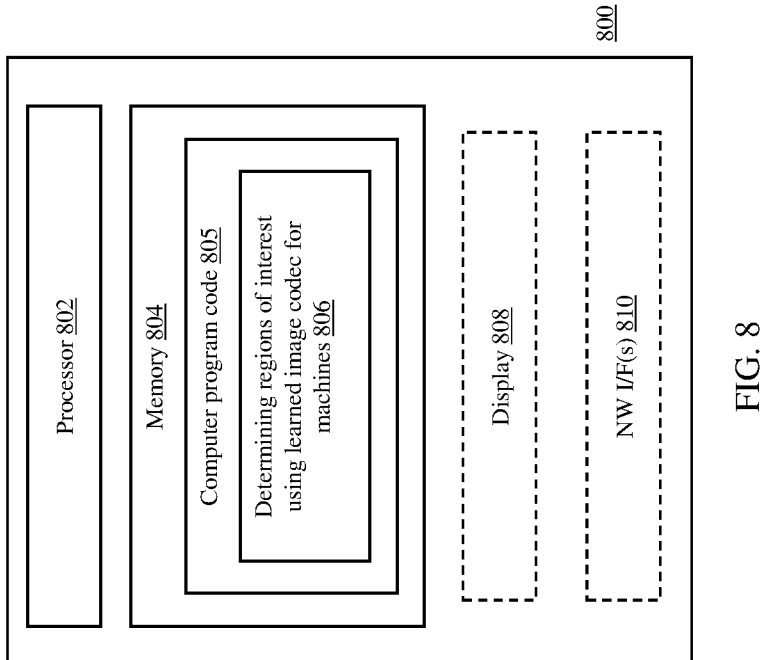

Processor 802

Memory 804

Computer program code 805

Determining regions of interest using learned image codec for machines 806

Display 808

DETERMINING REGIONS OF INTEREST USING LEARNED IMAGE CODEC FOR MACHINES

TECHNICAL FIELD

The examples and non-limiting embodiments relate generally to frame rate coding, and more particularly, to method, apparatus, and computer program product for determining regions of interest using learned image codec for machines.

BACKGROUND

It is known to provide video encoding and decoding.

SUMMARY

An example apparatus includes at least one processor; and at least one memory storing instructions that, when executed by the at least one processor, cause the apparatus at least to perform: encoding an input picture by using a first encoder or first encoding parameters; encoding the input picture by using a second encoder or second encoding parameters; generating a first reconstructed picture based on the encoding of the input picture by using the first encoder or the first encoding parameters; and generating a second reconstructed picture based on the encoding of the input picture by using the second encoder or the second encoding parameters.

The example apparatus may further include, wherein the first and the second encoding parameters comprise encoding parameters of the first encoder or the encoding parameters of the second encoder.

The example apparatus may further include, wherein the first reconstructed picture is generated by using a neural network based learned image codec by using a high quantization parameters value, and wherein the second reconstructed picture is generated by using a conventional video codec.

The example apparatus may further include, wherein the first reconstructed image is generated by using a neural network based learned image codec by using a setting that generates a low quality reconstructed picture, and wherein the second reconstructed picture is generated by using the neural network based learned image codec by using a setting that generates a high quality reconstructed picture.

The example apparatus may further include, wherein the apparatus is further caused to perform: partitioning the first and the second reconstructed pictures into blocks.

The example apparatus may further include, wherein for one or more block pairs in the first and the second reconstructed picture, and wherein the apparatus is further caused to perform: computing a first quality measurement of the first reconstructed picture with regard to a ground truth picture; computing a second quality measurement of the second reconstructed picture with regard to the ground truth picture; and calculating a difference or relative difference between the first and the second measurements.

The example apparatus may further include, wherein the apparatus is further caused to perform: deriving a first set of feature maps from the first reconstructed picture using a proxy network; deriving a second set of feature maps from the second reconstructed picture using the proxy network; deriving feature maps of the input picture from input data; determining first quality measurements of the first reconstructed picture based on the feature maps of the first reconstructed picture with regard to the feature maps from the input data; determining second quality measurements of the second reconstructed picture based on the feature maps of the second reconstructed picture with regard to the feature maps from the input data; and calculating a difference or a relative difference from the first and second quality measurements of corresponding blocks from the first set of feature maps and the second set of feature maps.

The example apparatus may further include, wherein the apparatus is further caused to perform: calculating a quality measurement of the first reconstructed picture; calculating a first quality measurement of a block with regard to the quality measurement of the first reconstructed picture; and determining a difference between the first quality measurement and the quality measurement of the first reconstructed picture.

The example apparatus may further include, wherein the apparatus is further caused to perform: calculating a quality measurement of the second reconstructed picture; calculating a second quality measurement of a block with regard to the quality measurement of the second reconstructed picture; and determining a difference between the second quality measurement and the quality measurement of the second reconstructed picture.

The example apparatus may further include, wherein the apparatus is caused to perform: categorizing a block as a background region when the difference is greater than a threshold; and/or categorizing a block as a foreground region when the difference is less than the threshold. In an alternate embodiment, the example apparatus may further include, wherein the apparatus is caused to perform: categorizing a block as a foreground region when the difference is greater than a threshold; and/or categorizing a block as a background region when the difference is less than the threshold.

The example apparatus may further include, wherein the apparatus is caused to perform: categorizing a block as a foreground region when the relative difference is greater than a threshold; and/or categorizing a block as a background region when the relative difference is less than the threshold. In an alternate embodiment, the example apparatus may further include, wherein the apparatus is caused to perform: categorizing a block as a background region when the relative difference is greater than a threshold; and/or categorizing a block as a foreground region when the relative difference is less than the threshold.

Another example apparatus includes at least one processor; and at least one memory storing instructions that, when executed by the at least one processor, cause the apparatus at least to perform: encoding an input picture using a neural network based learned image codec; and deriving a first reconstructed picture based on encoding.

The example apparatus may further include, wherein the apparatus is further caused to perform: partitioning the first reconstructed picture into blocks; for each block in the first reconstructed picture, computing a quality measurement of the reconstructed picture with regard to the input picture; categorizing a block as a background region when the quality measurement is greater than a threshold value; and/or categorizing the block as a foreground region when the quality measurement is lower than the threshold value. In an alternate embodiment, the example apparatus may further include, wherein the apparatus is further caused to perform: categorizing the block as a foreground region when the quality measurement is greater than a threshold value; and/or categorizing the block as a background region when the quality measurement is lower than the threshold value.

The example apparatus may further include, wherein the quality measurement of the first reconstructed picture is calculated in a feature domain.

The example apparatus may further include, wherein the apparatus is further caused to perform: deriving or generating a first bitstream based on the first reconstructed picture.

The example apparatus may further include, wherein apparatus is further caused to perform: determining a length of bits used to represent the block from the generated bitstream.

The example apparatus may further include, wherein the apparatus is further caused to perform: calculating bits per pixel (BPP) by dividing the length of the bits by a number of pixels in the block; categorizing a block as a foreground region when the BPP of the block is greater than a predefined threshold; and/or categorizing the block as a background region when the BPP of the block is smaller than the predefined threshold. In an alternate embodiment, the example apparatus may further include, wherein the apparatus is further caused to perform: categorizing a block as a background region when the BPP of the block is greater than a predefined threshold; and/or categorizing the block as a foreground region when the BPP of the block is smaller than the predefined threshold.

The example apparatus may further include, wherein the apparatus is further caused to perform: calculating a relative BPP of a block by subtracting a BPP value of the first reconstructed picture from the BPP value of the block; categorizing the block as a foreground region when the relative BPP of the block is greater than a predefined threshold; and/or categorizing the block as a background region when the relative BPP of the block is smaller than the predefined threshold. In an alternate embodiment, the example apparatus may further include, wherein the apparatus is further caused to perform: categorizing the block as a background region when the relative BPP of the block is greater than a predefined threshold; and/or categorizing the block as a foreground region when the relative BPP of the block is smaller than the predefined threshold.

The example apparatus may further include, wherein the apparatus is further caused to perform: calculating a BPP ratio by dividing a BPP value of the block by a BPP of first reconstructed picture; categorizing a block as a foreground region when the BPP ratio of the block is greater than a predefined threshold; and/or categorizing the block as a background region when the BPP ratio of the block is smaller than the predefined threshold. In an alternate embodiment, the example apparatus may further include, wherein the apparatus is further caused to perform: categorizing a block as a background region when the BPP ratio of the block is greater than a predefined threshold; and/or categorizing the block as a foreground region when the BPP ratio of the block is smaller than the predefined threshold.

The example apparatus may further include, wherein the input picture is encoded by the neural network learned image codec by using a setting for high quality reconstruction to generate the first reconstructed picture and the first bitstream, and wherein the apparatus is further caused to perform: encoding the input picture by using the neural network based learned image codec by using a setting for low-quality reconstruction; generating a second reconstructed picture based on encoding; and generating a second bitstream based on the second reconstructed picture.

The example apparatus may further include, wherein the apparatus is further caused to perform: partitioning the second reconstructed picture into blocks; calculating BPP values or relative BPP values of the block in the first and the second reconstructed pictures; calculating a difference of the BPP values or the relative difference of the relative BPP values is calculated by subtracting the BPP value or the relative BPP value of the second reconstructed picture from the BPP value or the relative BPP value of the first reconstructed picture; categorizing a block as a foreground region when the difference of the BPP value or the relative difference of the BPP value is greater than a predefined threshold value; and/or categorizing the block as a background region when the difference of the BPP value or the relative difference of the BPP value is smaller than a predefined threshold value. In an alternate embodiment, the example apparatus may further include, wherein the apparatus is further caused to perform: categorizing a block as a background region when the difference of the BPP value or the relative difference of the BPP value is greater than a predefined threshold value; and/or categorizing the block as a foreground region when the difference of the BPP value or the relative difference of the BPP value is smaller than a predefined threshold value.

The example apparatus may further include, wherein the apparatus is further caused to perform signaling one or more of following to a decoder: information of the foreground region; and/or information of the background region.

Yet another example apparatus includes at least one processor; and at least one memory storing instructions that, when executed by the at least one processor, cause the apparatus at least to perform: receiving a bitstream; generating a first reconstructed picture from the bitstream; and generating a second reconstructed picture from the bitstream.

The example apparatus may further include, wherein the apparatus is further caused to perform determining a region of interest (ROI) based on a quantization value of the first reconstructed picture, and wherein the first reconstructed picture comprises an intra frame.

The example apparatus may further include, wherein to determine the ROI, wherein the apparatus is further caused to perform: deriving a quantization value for a pixel, of the first reconstructed picture, in latent representation from a quantization factor value associated with the pixel and the quantization value; determining a difference between the quantization value of the pixel in the latent representation and the quantization value; categorizing the pixel as a foreground region, when the difference is larger than a threshold, wherein the foreground region comprises the ROI; and/or categorizing the pixel as a background region, when the difference is smaller than a threshold, wherein the background region comprises a non-ROI. In an alternate embodiment, the example apparatus may further include, wherein the apparatus is further caused to perform: categorizing the pixel as a background region, when the difference is larger than a threshold, wherein the background region comprises a non-ROI; and/or categorizing the pixel as a foreground region, when the difference is smaller than a threshold, wherein the foreground region comprises the ROI.

The example apparatus may further include, wherein the apparatus is further caused to perform: partitioning the first reconstructed picture into blocks, wherein the first reconstructed picture comprises an intra frame; determining average of quantization values of pixels in the latent representation corresponding to a block in the first reconstructed picture; categorizing the block as a foreground region when the average of quantization values of the pixels in the latent representation corresponding to the block is greater than a threshold, wherein the foreground comprises the ROI; and/ or categorizing the block as a background region when the average of quantization values of the pixels in the latent representation corresponding to the block is lesser than the threshold, wherein the background region comprises a non-ROI. In an alternate embodiment, the example apparatus may further include, wherein the apparatus is further caused to perform: categorizing the block as a background region when the average of quantization values of the pixels in the latent representation corresponding to the block is greater than a threshold, wherein the background region comprises a non-ROI; and/or categorizing the block as a foreground region when the average of quantization values of the pixels in the latent representation corresponding to the block is lesser than the threshold, wherein the foreground region comprises the ROI.

The example apparatus may further include, wherein the second reconstructed frame comprises an inter frame, and wherein the apparatus is further caused to perform: processing the ROI information detected from the decoded intra frame by using a motion compensation when the inter frame is decoded; using the motion compensation to transfer detected foreground region from the intra frame to the inter frame; and using the processed ROI information to estimate one or more decoding parameters of the inter frame.

The example apparatus may further include, wherein the second reconstructed frame comprises an inter frame, and wherein the apparatus is further caused to perform: receiving residuals of one or more decoding parameters; estimating one or more coding parameters of the inter frame; and adding the residual to the estimated one or more coding parameters to decode the inter frame.

An example method includes: encoding an input picture by using a first encoder or first encoding parameters; encoding the input picture by using a second encoder or second encoding parameters; generating a first reconstructed picture based on the encoding of the input picture by using the first encoder or the first encoding parameters; and generating a second reconstructed picture based on the encoding of the input picture by using the second encoder or the second encoding parameters.

The example method may further include, wherein the first and the second encoding parameters comprise encoding parameters of the first encoder or the encoding parameters of the second encoder.

The example method may further include, wherein the first reconstructed picture is generated by using a neural network based learned image codec by using a high quantization parameters value, and wherein the second reconstructed picture is generated by using a conventional video codec.

The example method may further include, wherein the first reconstructed image is generated by using a neural network based learned image codec by using a setting that generates a low quality reconstructed picture, and wherein the second reconstructed picture is generated by using the neural network based learned image codec by using a setting that generates a high quality reconstructed picture.

The example method may further include partitioning the first and the second reconstructed pictures into blocks.

The example method may further include, wherein for one or more block pairs in the first and the second reconstructed picture, and wherein the method further comprises: computing a first quality measurement of the first reconstructed picture with regard to a ground truth picture; computing a second quality measurement of the second reconstructed picture with regard to the ground truth picture;

and calculating a difference or relative difference between the first and the second measurements.

The example method may further include: deriving a first set of feature maps from the first reconstructed picture using a proxy network; deriving a second set of feature maps from the second reconstructed picture using the proxy network; deriving feature maps of the input picture from input data; determining first quality measurements of the first reconstructed picture based on the feature maps of the first reconstructed picture with regard to the feature maps from the input data; determining second quality measurements of the second reconstructed picture based on the feature maps of the second reconstructed picture with regard to the feature maps from the input data; and calculating a difference or a relative difference from the first and second quality measurements of corresponding blocks from the first set of feature maps and the second set of feature maps.

The example method may further include: calculating a quality measurement of the first reconstructed picture; calculating a first quality measurement of a block with regard to the quality measurement of the first reconstructed picture; and determining a difference between the first quality measurement and the quality measurement of the first reconstructed picture.

The example method may further include: calculating a quality measurement of the second reconstructed picture; calculating a second quality measurement of a block with regard to the quality measurement of the second reconstructed picture; and determining a difference between the second quality measurement and the quality measurement of the second reconstructed picture.

The example method may further include: categorizing a block as a background region when the difference is greater than a threshold; and/or categorizing a block as a foreground region when the difference is less than the threshold. In an alternate embodiment, the example method may further include: categorizing a block as a foreground region when the difference is greater than a threshold; and/or categorizing a block as a background region when the difference is less than the threshold.

The example method may further include: categorizing a block as a foreground region when the relative difference is greater than a threshold; and/or categorizing a block as a background region when the relative difference is less than the threshold. In an alternate embodiment, the example method may further include: categorizing a block as a background region when the relative difference is greater than a threshold; and/or categorizing a block as a foreground region when the relative difference is less than the threshold.

Another example method includes: encoding an input picture using a neural network based learned image codec; and deriving a first reconstructed picture based on encoding.

The example method may further include: partitioning the first reconstructed picture into blocks; for each block in the first reconstructed picture, computing a quality measurement of the reconstructed picture with regard to the input picture; categorizing a block as a background region when the quality measurement is greater than a threshold value; and/or categorizing the block as a foreground region when the quality measurement is lower than the threshold value. In an alternate embodiment, the example method may further include: categorizing a block as a foreground region when the quality measurement is greater than a threshold value; and/or categorizing the block as a background region when the quality measurement is lower than the threshold value.

The example method may further include, wherein the quality measurement of the first reconstructed picture is calculated in a feature domain.

The example method may further include deriving or generating a first bitstream based on the first reconstructed picture.

The example method may further include: determining a length of bits used to represent the block from the generated bitstream.

The example method may further include: calculating bits per pixel (BPP) by dividing the length of the bits by a number of pixels in the block; categorizing a block as a foreground region when the BPP of the block is greater than a predefined threshold; and/or categorizing the block as a background region when the BPP of the block is smaller than the predefined threshold. In an alternate embodiment, the example method may further include: categorizing a block as a background region when the BPP of the block is greater than a predefined threshold; and/or categorizing the block as a foreground region when the BPP of the block is smaller than the predefined threshold.

The example method may further include: calculating a relative BPP of a block by subtracting a BPP value of the first reconstructed picture from the BPP value of the block; categorizing the block as a foreground region when the relative BPP of the block is greater than a predefined threshold; and/or categorizing the block as a background region when the relative BPP of the block is smaller than the predefined threshold. In an alternate embodiment, the example method may further include: categorizing the block as a background region when the relative BPP of the block is greater than a predefined threshold; and/or categorizing the block as a foreground region when the relative BPP of the block is smaller than the predefined threshold.

The example method may further include: calculating a BPP ratio by dividing a BPP value of the block by a BPP of first reconstructed picture; categorizing a block as a foreground region when the BPP ratio of the block is greater than a predefined threshold; and/or categorizing the block as a background region when the BPP ratio of the block is smaller than the predefined threshold. In an alternate embodiment, the example method may further include: categorizing a block as a background region when the BPP ratio of the block is greater than a predefined threshold; and/or categorizing the block as a foreground region when the BPP ratio of the block is smaller than the predefined threshold.

The example method may further include, wherein the input picture is encoded by the neural network learned image codec by using a setting for high quality reconstruction to generate the first reconstructed picture and the first bitstream, and wherein the method further comprises: encoding the input picture by using the neural network based learned image codec by using a setting for low-quality reconstruction; generating a second reconstructed picture based on encoding; and generating a second bitstream based on the second reconstructed picture.

The example method may further include: partitioning the second reconstructed picture into blocks; calculating BPP values or relative BPP values of the block in the first and the second reconstructed pictures; calculating a difference of the BPP values or the relative difference of the relative BPP values is calculated by subtracting the BPP value or the relative BPP value of the second reconstructed picture from the BPP value or the relative BPP value of the first reconstructed picture; categorizing a block as a foreground region when the difference of the BPP value or the relative difference of the BPP value is greater than a predefined threshold value; and/or categorizing the block as a background region when the difference of the BPP value or the relative difference of the BPP value is smaller than a predefined threshold value. In an alternate embodiment, the example method may further include: categorizing a block as a background region when the difference of the BPP value or the relative difference of the BPP value is greater than a predefined threshold value; and/or categorizing the block as a background region when the difference of the BPP value or the relative difference of the BPP value is smaller than a predefined threshold value.

The example method may further include signaling one or more of following to a decoder: information of the foreground region; and/or information of the background region.

Yet another example method includes: receiving a bitstream; generating a first reconstructed picture from the bitstream; and generating a second reconstructed picture from the bitstream.

The example method may further include determining a region of interest (ROI) based on a quantization value of the first reconstructed picture, wherein the first reconstructed picture comprises an intra frame.

The example method may further include: deriving a quantization value for a pixel, of the first reconstructed picture, in latent representation from a quantization factor value associated with the pixel and the quantization value; determining a difference between the quantization value of the pixel in the latent representation and the quantization value; categorizing the pixel as a foreground region, when the difference is larger than a threshold, wherein the foreground region comprises the ROI; and/or categorizing the pixel as a background region, when the difference is smaller than a threshold, wherein the background region comprises a non-ROI. In an alternate embodiment, the example method may further include: categorizing the pixel as a background region, when the difference is larger than a threshold, wherein the background region comprises a non-ROI; and/or categorizing the pixel as a foreground region, when the difference is smaller than a threshold, wherein the foreground region comprises the ROI.

The example method may further include: partitioning the first reconstructed picture into blocks, wherein the first reconstructed picture comprises an intra frame; determining average of quantization values of pixels in the latent representation corresponding to a block in the first reconstructed picture; categorizing the block as a foreground region when the average of quantization values of the pixels in the latent representation corresponding to the block is greater than a threshold, wherein the foreground comprises the ROI; and/or categorizing the block as a background region when the average of quantization values of the pixels in the latent representation corresponding to the block is lesser than the threshold, wherein the background region comprises a non-ROI. In an alternate embodiment, the example method may further include: categorizing the block as a background region when the average of quantization values of the pixels in the latent representation corresponding to the block is greater than a threshold, wherein the background comprises a non-ROI; and/or categorizing the block as a foreground region when the average of quantization values of the pixels in the latent representation corresponding to the block is lesser than the threshold, wherein the foreground region comprises the ROI.

The example method may further include, wherein the second reconstructed frame comprises an inter frame, and wherein the method is further comprises: processing the ROI information detected from the decoded intra frame by using a motion compensation when the inter frame is decoded; using the motion compensation to transfer detected foreground region from the intra frame to the inter frame; and using the processed ROI information to estimate one or more decoding parameters of the inter frame.

The example method may further include, wherein the second reconstructed frame comprises an inter frame, and wherein the method is further comprises: receiving residuals of one or more decoding parameters; estimating one or more coding parameters of the inter frame; and adding the residual to the estimated one or more coding parameters to decode the inter frame.

A non-transitory computer readable medium comprising program instructions that, when executed by an apparatus, cause the apparatus to perform to perform the methods as described in any of the previous paragraphs.

An apparatus comprising means for performing methods as described in any of the previous paragraphs.

BRIEF DESCRIPTION OF THE DRAWINGS

The foregoing embodiments and other features are explained in the following description, taken in connection with the accompanying drawings, wherein:

FIG. 8 is an example apparatus, which may be implemented in hardware, and is caused to, perform determining regions of interest using learned image codec for machines based on the examples described herein.

FIG. 9 is an example method to implement the embodiments described herein, in accordance with an embodiment.

DETAILED DESCRIPTION OF EXAMPLE EMBODIMENTS

Figure 2:
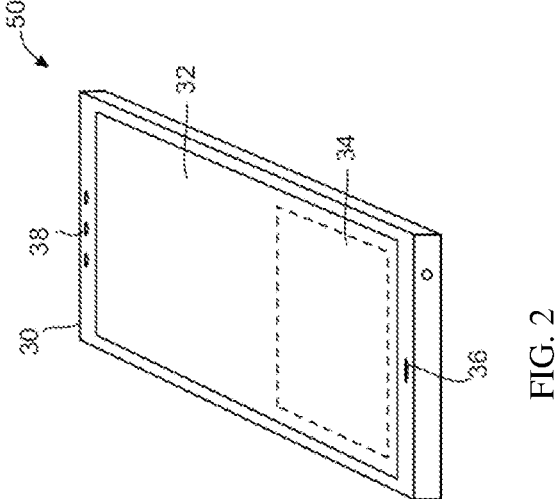
FIG. 2 shows schematically a user equipment suitable for employing embodiments of the examples described herein.

The following acronyms and abbreviations that may be found in the specification and/or the drawing figures are defined as follows:

3GP 3GPP file format
3GPP 3rd Generation Partnership Project
3GPP TS 3GPP technical specification
4CC four character code
4G fourth generation of broadband cellular network technology 5G fifth generation cellular network technology
5GC 5G core network
ACC accuracy
AGT approximated ground truth data
AI artificial intelligence
AIoT AI-enabled IoT
ALF adaptive loop filtering
a.k.a. also known as
AMF access and mobility management function
APS adaptation parameter set
AVC advanced video coding
bpp bits-per-pixel
CABAC context-adaptive binary arithmetic coding
CDMA code-division multiple access
CE core experiment
ctu coding tree unit
CU central unit
CVC conventional video codec
DASH dynamic adaptive streaming over HTTP
DCT discrete cosine transform
DCI decoding compatibility information
DSP digital signal processor
DSNN decoder-side NN
DU distributed unit
eNB (or eNodeB) evolved Node B (for example, an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, for example, the LTE radio access technology
FDMA frequency division multiple access
f(n) fixed-pattern bit string using n bits written (from left to right) with the left bit first.
F1 or F1-C interface between CU and DU control interface
FDC finetuning-driving content
gNB (or gNodeB) base station for 5G/NR, for example, a node providing NR user plane and control plane protocol terminations towards the UE, and connected via the NG interface to the 5GC
GSM Global System for Mobile communications
GT ground truth
H.222.0 MPEG-2 Systems is formally known as ISO/IEC 13818-1 and as ITU-T Rec. H.222.0
H.26x family of video coding standards in the domain of the ITU-T
HLS high level syntax
HQ high-quality
IBC intra block copy
ID identifier
IEC International Electrotechnical Commission
IEEE Institute of Electrical and Electronics Engineers
I/F interface
IMD integrated messaging device
IMS instant messaging service
IoT internet of things
IP internet protocol
IRAP intra random access point
ISO International Organization for Standardization
ISOBMFF ISO base media file format
ITU International Telecommunication Union
ITU-T ITU Telecommunication Standardization Sector
JPEG joint photographic experts group
LCVC lossy conventional video codec
LIC learned image compression LL-CVC lossless conventional video codec
LMCS luma mapping with chroma scaling
LPNN loss proxy NN
LQ low-quality
LTE long-term evolution
LZMA Lempel-Ziv-Markov chain compression
LZMA2 simple container format that can include both uncompressed data and LZMA data
LZO Lempel-Ziv-Oberhumer compression
LZW Lempel-Ziv-Welch compression
MAC medium access control
mdat MediaDataBox
MME mobility management entity
MMS multimedia messaging service
moov MovieBox
MP4 file format for MPEG-4 Part 14 files
MPEG moving picture experts group
MPEG-2 H.222/H.262 as defined by the ITU
MPEG-4 audio and video coding standard for ISO/IEC 14496
MSB most significant bit
MSE Mean-squared error
NAL network abstraction layer
NDU NN compressed data unit
ng or NG new generation
ng-eNB or NG-eNB new generation eNB
NN neural network
NNEF neural network exchange format
NNR neural network representation
NR new radio (5G radio)
N/W or NW network
OBU open bitstream unit
ONNX Open Neural Network eXchange
PB protocol buffers
PC personal computer
PDA personal digital assistant
PDCP packet data convergence protocol
PHY physical layer
PID packet identifier
PLC power line communication
PNG portable network graphics
PSNR peak signal-to-noise ratio
RA Random access
RAM random access memory
RAN radio access network
RBSP raw byte sequence payload
RD loss rate distortion loss
RFC request for comments
RFID radio frequency identification
RLC radio link control
RRC radio resource control
RRH remote radio head
RU radio unit
Rx receiver
SDAP service data adaptation protocol
SGD Stochastic Gradient Descent
SGW serving gateway
SMF session management function
SMS short messaging service
SPS sequence parameter set
st(v) null-terminated string encoded as UTF-8 characters as specified in ISO/IEC 10646
SVC scalable video coding
S1 interface between eNodeBs and the EPC
TCP-IP transmission control protocol-internet protocol
TDMA time divisional multiple access
trak TrackBox TS transport stream
TUC technology under consideration
TV television
Tx transmitter
UE user equipment
ue(v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
UTF-8 8-bit Unicode Transformation Format
VPS video parameter set
WLAN wireless local area network
X2 interconnecting interface between two eNodeBs in LTE network
Xn interface between two NG-RAN nodes Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data,' 'content,' 'information,' and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium,' which refers to a non-transitory physical storage medium (e.g., volatile or non-volatile memory device), can be differentiated from a 'computer-readable transmission medium,' which refers to an electromagnetic signal.

A method, apparatus and computer program product are provided in accordance with example embodiments for determining regions of interest using learned image codec for machines. In an embodiment, the regions of interest are coded for machine consumption.

Figure 1:
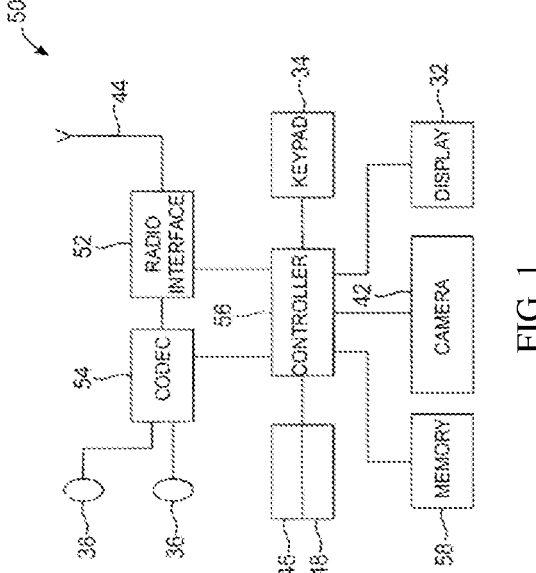
FIG. 1 shows schematically an electronic device employing embodiments of the examples described herein.

In an example, the following describes in detail suitable apparatus and possible mechanisms for determining regions of interest using learned image codec for machines. In this regard reference is first made to FIG. 1 and FIG. 2, where FIG. 1 shows an example block diagram of an apparatus 50. The apparatus may be an Internet of Things (IoT) apparatus configured to perform various functions, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The apparatus 50 may for example be a mobile terminal or user equipment of a wireless communication system, a sensor device, a tag, or a lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 may further comprise a display 32, for example, in the form of a liquid crystal display, light emitting diode display, organic light emitting diode display, and the like. In other embodiments of the examples described herein the display may be any suitable display technology suitable to display media or multimedia content, for example, an image or a video. The apparatus 50 may further comprise a keypad 34. In other embodiments of the examples described herein any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, a processor or a processor circuitry for controlling the apparatus 50. The controller 56 may be connected to a memory 58 which in embodiments of the examples described herein may store both data in the form of an image, audio data and video data, and/or may also store instructions for implementation on the controller 56. The controller 56 may further be connected to codec circuitry 54 suitable for carrying out coding and/or decoding of audio, image and/or video data or assisting in coding and/or decoding carried out by the controller.

The apparatus 50 may further comprise a card reader 48 and a smart card 46, for example, a UICC and UICC reader for providing user information and being suitable for providing authentication information for authentication and authorization of the user at a network.

The apparatus 50 may comprise radio interface circuitry 52 connected to the controller and suitable for generating wireless communication signals, for example, for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec circuitry 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Fundamentals of Neural Networks

A neural network (NN) is a computation graph consisting of several layers of computation. Each layer consists of one or more units, where each unit performs a computation. A unit is connected to one or more other units, and a connection may be associated with a weight. The weight may be used for scaling the signal passing through an associated connection. Weights are learnable parameters, for example, values which can be learned from training data. There may be other learnable parameters, such as those of batch-normalization layers.

Couple of examples of architectures for neural networks are feed-forward and recurrent architectures. Feed-forward neural networks are such that there is no feedback loop, each layer takes input from one or more of the previous layers, and provides its output as the input for one or more of the subsequent layers. Also, units inside a certain layer take input from units in one or more of preceding layers and provide output to one or more of following layers.

Initial layers, those close to the input data, extract semantically low-level features, for example, edges and textures in images, and intermediate and final layers extract more high-level features. After the feature extraction layers there may be one or more layers performing a certain task, for example, classification, semantic segmentation, object detection, denoising, style transfer, super-resolution, and the like. In recurrent neural networks, there is a feedback loop, so that the neural network becomes stateful, for example, it is able to memorize information or a state.

Neural networks are being utilized in an ever-increasing number of applications for many different types of devices, for example, mobile phones, chat bots, IoT devices, smart cars, voice assistants, and the like. Some of these applications include, but are not limited to, image and video analysis and processing, social media data analysis, device usage data analysis, and the like.

One of the properties of neural networks, and other machine learning tools, is that they are able to learn properties from input data, either in a supervised way or in an unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output error, also referred to as the loss. Examples of losses are mean squared error, cross-entropy, and the like. In recent deep learning techniques, training is an iterative process, where at each iteration the algorithm modifies the weights of the neural network to make a gradual improvement in the network's output, for example, gradually decrease the loss.

Training a neural network is an optimization process, but the final goal is different from the typical goal of optimization. In optimization, the only goal is to minimize a function. In machine learning, the goal of the optimization or training process is to make the model learn the properties of the data distribution from a limited training dataset. In other words, the goal is to learn to use a limited training dataset in order to learn to generalize to previously unseen data, for example, data which was not used for training the model. This is usually referred to as generalization. In practice, data is usually split into at least two sets, the training set and the validation set. The training set is used for training the network, for example, to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following:

when the network is learning at all—in this case, the training set error should decrease, otherwise the model is in the regime of underfitting.

when the network is learning to generalize—in this case, also the validation set error needs to decrease and be not too much higher than the training set error. For example, the validation set error should be less than 20% higher than the training set error. If the training set error is low, for example 10% of its value at the beginning of training, or with respect to a threshold that may have been determined based on an evaluation metric, but the validation set error is much higher than the training set error, or it does not decrease, or it even increases, the model is in the regime of overfitting. This means that the model has just memorized properties of the training set and performs well only on that set, but performs poorly on a set not used for training or tuning of its parameters.

Lately, neural networks have been used for compressing and de-compressing data such as images. The most widely used architecture for such task is the auto-encoder, which is a neural network consisting of two parts: a neural encoder and a neural decoder. In various embodiments, these neural encoder and neural decoder would be referred to as encoder and decoder, even though these refer to algorithms which are learned from data instead of being tuned manually. The encoder takes an image as an input and produces a code, to represent the input image, which requires less bits than the input image. This code may have been obtained by a binarization or quantization process after the encoder. The decoder takes in this code and reconstructs the image which was input to the encoder.

Such encoder and decoder are usually trained to minimize a combination of bitrate and distortion, where the distortion may be based on one or more of the following metrics: mean squared error (MSE), peak signal-to-noise ratio (PSNR), structural similarity index measure (SSIM), or the like. These distortion metrics are meant to be correlated to the human visual perception quality, so that minimizing or maximizing one or more of these distortion metrics results into improving the visual quality of the decoded image as perceived by humans.

In various embodiments, terms 'model', 'neural network', 'neural net' and 'network' may be used interchangeably, and also the weights of neural networks may be sometimes referred to as learnable parameters or as parameters.

Fundamentals of Video/Image Coding

Video codec consists of an encoder that transforms the input video into a compressed representation suited for storage/transmission and a decoder that can decompress the compressed video representation back into a viewable form. Typically, an encoder discards some information in the original video sequence in order to represent the video in a more compact form, for example, at lower bitrate.

Typical hybrid video codecs, for example ITU-T H.263 and H.264, encode the video information in two phases. Firstly, pixel values in a certain picture area (or 'block') are predicted, for example, by motion compensation means or circuits (by finding and indicating an area in one of the previously coded video frames that corresponds closely to the block being coded) or by spatial means or circuit (by using the pixel values around the block to be coded in a specified manner). Secondly, the prediction error, e.g. the difference between the predicted block of pixels and the original block of pixels, is coded. This is typically done by transforming the difference in pixel values using a specified transform (e.g. discrete cosine transform (DCT) or a variant of it), quantizing the coefficients and entropy coding the quantized coefficients. By varying the fidelity of the quantization process, the encoder may control the balance between the accuracy of the pixel representation (e.g., picture quality) and size of the resulting coded video representation (e.g., file size or transmission bitrate).

In other example, the pixel values may be predicted by using spatial prediction techniques. This prediction technique uses the pixel values around the block to be coded in a specified manner. Secondly, the prediction error, for example, the difference between the predicted block of pixels and the original block of pixels is coded. This is typically done by transforming the difference in pixel values using a specified transform, for example, discrete cosine transform (DCT) or a variant of it; quantizing the coefficients; and entropy coding the quantized coefficients. By varying the fidelity of the quantization process, encoder can control the balance between the accuracy of the pixel representation, for example, picture quality and size of the resulting coded video representation, for example, file size or transmission bitrate.

Inter prediction, which may also be referred to as temporal prediction, motion compensation, or motion-compensated prediction, exploits temporal redundancy. In inter prediction the sources of prediction are previously decoded pictures, e.g., reference pictures.

In temporal inter prediction, the sources of prediction are previously decoded pictures in the same scalable layer. In intra block copy (IBC), e.g., intra-block-copy prediction, prediction may be applied similarly to temporal inter prediction but the reference picture is the current picture and only previously decoded samples may be referred in the prediction process. Inter-layer or inter-view prediction may be applied similarly to temporal inter prediction, but the reference picture is a decoded picture from another scalable layer or from another view, respectively. In some cases, inter prediction may refer to temporal inter prediction only, while in other cases inter prediction may refer collectively to temporal inter prediction and any of intra block copy, inter-layer prediction, and inter-view prediction provided that they are performed with the same or similar process than temporal prediction. Inter prediction, temporal inter prediction, or temporal prediction may sometimes be referred to as motion compensation or motion-compensated prediction.

Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra-coding, where no inter prediction is applied.

One example outcome of the coding procedure is a set of coding parameters, such as motion vectors and quantized transform coefficients. Many parameters can be entropy-coded more efficiently when they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction techniques similar to the encoder to form a predicted representation of the pixel blocks. For example, using the motion or spatial information created by the encoder and stored in the compressed representation and prediction error decoding, which is inverse operation of the prediction error coding recovering the quantized prediction error signal in spatial pixel domain. After applying prediction and prediction error decoding techniques the decoder sums up the prediction and prediction error signals, for example, pixel values to form the output video frame. The decoder and encoder can also apply additional filtering techniques to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded in the encoder side or decoded in the decoder side and the prediction source block in one of the previously coded or decoded pictures.

In order to represent motion vectors efficiently, the motion vectors are typically coded differentially with respect to block specific predicted motion vectors. In typical video codecs, the predicted motion vectors are created in a pre-defined way, for example, calculating the median of the encoded or decoded motion vectors of the adjacent blocks.

Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture.

Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal refer-ence pictures and the used motion field information is signaled among a list of motion field candidate list filled with motion field information of available adjacent/co-located blocks.

In typical video codecs, the prediction residual after motion compensation is first transformed with a transform kernel, for example, DCT and then coded. The reason for this is that often there still exists some correlation among the residual and transform can in many cases help reduce this correlation and provide more efficient coding.

Typical video encoders utilize Lagrangian cost functions to find optimal coding modes, for example, the desired macroblock mode and associated motion vectors. This kind of cost function uses a weighting factor $\lambda$ to tie together the exact or estimated image distortion due to lossy coding methods and the exact or estimated amount of information that is required to represent the pixel values in an image area:

$$C = D + \lambda R \qquad\qquad \text{equation 1}$$

In equation 1, C is the Lagrangian cost to be minimized, D is the image distortion, for example, mean squared error with the mode and motion vectors considered, and R is the number of bits needed to represent the required data to reconstruct the image block in the decoder including the amount of data to represent the candidate motion vectors.

Video coding specifications may enable the use of supplemental enhancement information (SEI) messages or alike. Some video coding specifications include SEI NAL units, and some video coding specifications include both prefix SEI NAL units and suffix SEI NAL units, where the former type may start a picture unit or alike and the latter type may end a picture unit or alike. An SEI NAL unit may include one or more SEI messages, which are not required for the decoding of output pictures but may assist in related processes, such as picture output timing, post-processing of decoded pictures, rendering, error detection, error concealment, and resource reservation. Several SEI messages are specified in H.264/AVC, H.265/HEVC, H.266/VVC, and H.274/VSEI standards, and the user data SEI messages enable organizations and companies to specify SEI messages for their own use. The standards may contain the syntax and semantics for the specified SEI messages but a process for handling the messages in the recipient may not be defined. Consequently, encoders may be required to follow the standard specifying a SEI message when they create SEI message(s), and decoders may not be required to process SEI messages for output order conformance. One of the example reasons to include the syntax and semantics of SEI messages in standards is to allow different system specifications to interpret the supplemental information identically and hence interoperate. It is intended that system specifications may require the use of particular SEI messages both in the encoding end and in the decoding end, and additionally the process for handling particular SEI messages in the recipient may be specified.

Scaling Window

A scaling window may be signaled for and associated with a picture. Scaling windows of a picture and its reference picture may indicate the spatial correspondence between the pictures. Scaling windows may be used to achieve one or both of the following: i) a horizontal scaling ratio and a vertical scaling ratio may be derived based on the width ratio and the height ratio, respectively, of the scaling windows; ii) a left offset and a top offset for inter prediction may be derived. The horizontal and vertical scaling ratios may be used as resampling ratios for RPR. The left and top offsets may be used in deriving a spatial correspondence between a picture and its reference picture. The left and top offsets may be added in the reference picture location derivation through a motion vector scaled by a scaling ratio. For example, the top-left corner of the current block is mapped to the respective 'anchor location' in the reference picture through the left and top offsets, and a motion vector scaled by a scaling ratio is then applied to obtain a reference block in relation to anchor location. In general, the scaling ratio may be 1:1, in which case the left and top offsets may be applied without resampling. It needs to be understood that there may be other means to signal scaling ratio(s), top offset, and/or left offset than scaling windows.

In VVC, a scaling window may be indicated in a PPS explicitly or implicitly. When indicated explicitly, pps_scaling_win_left_offset, pps_scaling_win_right_offset, pps_scaling_win_top_offset, and pps_scaling_win_bottom_offset specify the offsets of the scaling window boundaries relative to the left, right, top, and bottom boundaries of the conformance cropping window, respectively. When indicated implicitly, the scaling window is inferred to be identical to the conformance cropping window.

Scalable Video Coding

A scalable bitstream may include a 'base layer' providing the lowest quality video available and one or more enhancement layers that enhance the video quality when received and decoded together with the lower layers. In order to improve coding efficiency for the enhancement layers, the coded representation of that layer may depend on the lower layers. E.g., the motion and mode information of the enhancement layer may be predicted from lower layers. Similarly, the pixel data of the lower layers can be used to create prediction for the enhancement layer.

A scalable video codec for quality scalability (also known as signal-to-noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use, e.g., with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

Scalability modes or scalability dimensions may include, but are not limited, to one or more of the following:

Quality scalability: Base layer pictures are coded at a lower quality than enhancement layer pictures, which may be achieved, for example, by using a greater quantization parameter value (e.g., a greater quantization step size for transform coefficient quantization) in the base layer than in the enhancement layer.

Spatial scalability: Base layer pictures are coded at a lower resolution (e.g., have fewer samples) than enhancement layer pictures. Spatial scalability and quality scalability may sometimes be considered the same type of scalability.

Bit-depth scalability: Base layer pictures are coded at lower bit-depth (e.g., 8 bits) than enhancement layer pictures (e.g., 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g., coded in 4:2:0 chroma format) than enhancement layer pictures (e.g., 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

Region-of-interest (ROI) scalability: An enhancement layer represents a spatial subset of the base layer. ROI scalability may be used together with other types of scalabilities, e.g., quality or spatial scalability so that the enhancement layer provides higher subjective quality for the spatial subset.

View scalability, which may also be referred to as multiview coding. In an example, the base layer represents a first view or a first camera, whereas an enhancement layer represents a second view or a second camera. In another example, the base layer represents a first set of views, which may be for example frame-packed, whereas an enhancement layer represents a second set of views.

Depth scalability, which may also be referred to as depth-enhanced coding. A layer or some layers of a bitstream may represent texture view(s), while other layer or layers may represent depth view(s).

In all of the above scalability examples, base layer information may be used to code enhancement layer to minimize the additional bitrate overhead.

Scalability may be enabled in two example ways. Either by introducing new coding modes for performing prediction of pixel values or syntax from lower layers of the scalable representation; or by placing the lower layer pictures to the reference picture buffer (decoded picture buffer, (DPB)) of the higher layer. The first approach (coding modes) is more flexible and thus may provide better coding efficiency in most cases. The reference frame-based scalability approach may be implemented more efficiently with minimal changes to single layer codecs, as compared to the first approach, while still achieving majority of the coding efficiency gains available. For example, a reference frame-based scalability codec may be implemented by utilizing the same hardware or software implementation for all the layers, by simply managing of the DPB management by external means.

In ROI scalability, spatial correspondence of an ROI enhancement layer in relation to its reference layer(s) is indicated. In VVC, scaling windows can be used to indicate this spatial correspondence.

It has been proposed, e.g., in JVET-O1150 (https://www.jvet-experts.org/doc_end_user/documents/15_Gothenburg/wg11/JVET-O1150-v2.zip; last accessed on Apr. 19, 2023), that temporal sublayers may be used for any type of scalability. A mapping of scalability dimensions to sublayer identifiers could be provided, e.g., in a VPS or in an SEI message.

Frame Packing

Frame packing may be defined to comprise arranging more than one input picture, which may be referred to as (input) constituent frames, into an output picture, or arranging the input pictures as a temporal interleaving of alternating first and second constituent frames.

A constituent frame parity may be defined as a first constituent frame or a second constituent frame, or equivalent as constituent frame 0 or constituent frame 1.

In general, frame packing is not limited to any particular type of constituent frames or the constituent frames need not have a particular relation with each other. In many cases, frame packing is used for arranging constituent frames of a stereoscopic video clip into a single picture sequence, as explained in more details in the next paragraph. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream, e.g., by a video encoder. The bitstream may be decoded e.g. by a video decoder. The decoder or a post-processing operation after decoding may extract the decoded constituent frames from the decoded picture(s), e.g., for displaying.

In frame-compatible stereoscopic video (e.g., frame packing of stereoscopic video), a spatial packing of a stereo pair into a single frame is performed at the encoder side as a pre-processing step for encoding and then the frame-packed frames are encoded with a conventional 2D video coding scheme. The output frames produced by the decoder contain constituent frames of a stereo pair.

In a typical operation mode, the spatial resolution of the original frames of each view and the packed single frame have the same resolution. In this case the encoder downsamples the two views of the stereoscopic video before the packing operation. The spatial packing may use for example a side-by-side or top-bottom format, and the downsampling should be performed accordingly.

An encoder may indicate the use of frame packing by including one or more frame packing arrangement SEI messages, e.g. as defined in VSEI, in the bitstream. Likewise, a decoder may conclude the use of frame packing by decoding one or more frame packing arrangement SEI messages from the bitstream. When a frame packing arrangement SEI message applies to the current coded layer video sequence (CLVS), a cropped decoded picture contains samples of multiple distinct spatially packed constituent frames that are packed into one frame, or the output cropped decoded pictures in output order form a temporal interleaving of alternating first and second constituent frames, using an indicated frame packing arrangement scheme. This information can be used by the decoder to appropriately rearrange the samples and process the samples of the constituent frames appropriately for display or other purposes.

In some video codecs, video usability information (VUI) may be included in a sequence parameter set (SPS). VUI specified in VSEI comprises the following:

vui_non_packed_constraint_flag equal to 1 specifies that there shall not be any frame packing arrangement SEI messages present in the bitstream that apply to the CLVS. vui_non_packed_constraint_flag equal to 0 does not impose such a constraint.

Inter-view sample prediction between spatially frame-packed constituent frames may be enabled with the intra block copy tool as follows. A first constituent frame representing a first view and a second constituent frame representing a second view of the same multiview (e.g., stereoscopic) content are frame-packed. Intra-block-copy prediction from the first constituent frame to the second constituent frame is enabled in encoding, but intra-block-copy prediction from the second constituent frame to the first constituent frame is disabled in encoding. Hence, interview sample prediction is essentially achieved by applying intra-block-copy prediction between constituent frames of different views. Compression efficiency is hence improved compared to coding of frame-packed multiview content without intra-block-copy prediction.

Neural-Network Post-Filter Characteristics (NNPFC) and Neural-Network Post-Filter Activation (NNPFA) SEI Messages The neural-network post-filter characteristics (NNPFC) SEI message and the neural-network post-filter activation (NNPFA) SEI message have been described in document JVET-AB2006.

The NNPFC SEI message comprises the nnpfc_id syntax element, which includes an identifying number that may be used to identify a post-processing filter. A base post-processing filter is the filter that is included in or identified by the first NNPFC SEI message, in decoding order, that has a particular nnpfc_id value within a coded layer video sequence (CLVS). When there is a second NNPFC SEI message that has the same nnpfc_id value that defines the base post-processing filter, an update relative to the base post-processing filter is applied to obtain a post-processing filter associated with the nnpfc_id value. The update may be obtained by decoding the coded neural network bitstream in the second NNPFC SEI message. Otherwise, the post-processing filter associated with the nnpfc_id value is assigned to be the same as the base post-processing filter.

The NNPFC SEI message comprises nnpfc_mode_idc syntax element, the semantics of which may be defined as follows:

nnpfc_mode_idc equal to 0 specifies that the base post-processing filter or the update relative to the base post-processing filter associated with the nnpfc_id value is a neural network identified by the Uniform Resource Identifier (URI) nnpfc_uri with the format identified by the tag URI nnpfc_tag_uri.

nnpfc_mode_idc equal to 1 indicates that this SEI message contains an ISO/IEC 15938-17 bitstream that specifies the base post-processing filter or updates relative to the base post-processing filter with the same nnpfc_id value.

The NNPFC SEI message may also comprise:

Purpose of the post-processing filter, such as:

Visual quality improvement

Chroma upsampling from the 4:2:0 chroma format to the 4:2:2 or 4:4:4 chroma format, or from the 4:2:2 chroma format to the 4:4:4 chroma format Increasing the width or height of the cropped decoded output picture without changing the chroma format Increasing the width or height of the cropped decoded output picture and upsampling the chroma format Frame rate upsampling Formatting of the input tensors that are given as input to the neural network inference Formatting of the output tensors that are resulting from the neural network inference Characterization of the complexity of the neural network The NNPFA SEI message specifies the neural-network post-processing filter that may be used for post-processing filtering for the current picture, or for post-processing filtering for the current picture and one or more other pictures. The NNPFA SEI message comprises the nnpfa_target_id syntax element, which indicates that the neural-network post-processing filter with nnpfc_id equal to nnfpa_target_id may be used for post-processing filtering for the indicated persistence. The indicated persistence may be the current picture only (nnpfa_persistence_flag equal to 0), or until the end of the current CLVS or the next picture, in output order, in the current layer associated with a NNPFA SEI message with the same nnpfa_target_id as the current SEI message (nnpfa_persistence_flag equal to 1).

Annotated Regions SEI Message

The annotated regions SEI message has been specified in the VSEI standard (ISO/IEC 23002-7|ITU-T H.274) as well as in HEVC (ISO/IEC 23008-2|ITU-T H.265). In the following, the syntax element names refer to the VSEI definition of the annotated regions SEI message.

The annotated regions SEI message carries parameters that identify annotated regions using bounding boxes representing the size and location of identified objects.

The annotated regions SEI message may comprise, but may not be limited to, one or more pieces of the following information:

ar_not_optimized_for_viewing_flag equal to 1 indicates that the decoded pictures that the annotated regions SEI message applies to are not optimized for user viewing, but rather are optimized for some other purpose such as algorithmic object classification performance. ar_not_optimized_for_viewing_flag equal to 0 indicates that the decoded pictures that the annotated regions SEI message applies to may or may not be optimized for user viewing.

ar_true_motion_flag equal to 1 indicates that the motion information in the coded pictures that the annotated regions SEI message applies to was selected with a goal of accurately representing object motion for objects in the annotated regions. ar_true_motion_flag equal to 0 indicates that the motion information in the coded pictures that the annotated regions SEI message applies to may or may not have been selected with a goal of accurately representing object motion for objects in the annotated regions.

ar_occluded_object_flag equal to 1 indicates that each of the bounding boxes represents the size and location of an object or a portion of an object that may not be visible or may be only partially visible within the cropped decoded picture that the annotated regions SEI message applies to. ar_occluded_object_flag equal to 0 indicates that each of the bounding boxes represents the size and location of an object that is entirely visible within the cropped decoded picture that the annotated regions SEI message applies to.

Textual labels, which are assigned indices.

A language used in the labels.

A mapping of an object to a label index.

A bounding box of an object.

An indication of whether the bounding box represents the size and location of an object that is only partially visible within the cropped decoded picture.

A degree of confidence associated with an object.

Regional Nesting SEI Message

The regional nesting SEI message has been specified in the H.265/HEVC standard. The regional nesting SEI message provides a mechanism to associate SEI messages with regions of the picture. The associated SEI messages are conveyed within the regional nesting SEI message.

A regional nesting SEI message includes one or more SEI messages. When an SEI message is included in a regional nesting SEI message, the included SEI message may be referred to as a region-nested SEI message. When an SEI message is not included in a regional nesting SEI message, the SEI message may be referred to as a non-region-nested SEI message.

For each region-nested SEI message in a regional nesting SEI message, one or more regions are specified in the regional nesting SEI message, and the semantics of the region-nested SEI message are to be interpreted as applying to each of these regions.

When an access unit includes both region-nested SEI messages of a particular type and non-region-nested SEI messages of the same type, decoders may choose to ignore either all the region-nested SEI message of that type or all the non-region-nested SEI messages of that type.

The regional nesting SEI message may comprise, but may not be limited to, one or more pieces of the following information:

the number of rectangular regions (regional_nesting_num_rect_regions)

an identifier for each rectangular region specified in the regional nesting SEI message the bounding box coordinates of each rectangular region the number of region-nested SEI messages in the regional nesting SEI message the number of regions for each region-nested SEI message for each region-nested SEI message, the indices (regional_nesting_sei_region_idx [i][j]), into the list of regions specified in the regional nesting SEI message, that specify the regions that the region-nested SEI message applies Information on Video Coding for Machines (VCM)

Reducing the distortion in image and video compression is often intended to increase human perceptual quality, as humans are considered to be the end users, e.g. consuming or watching the decoded images or videos. Recently, with the advent of machine learning, especially deep learning, there is a rising number of machines (e.g., autonomous agents) that analyze or process data independently from humans and may even take decisions based on the analysis results without human intervention. Examples of such analysis are object detection, scene classification, semantic segmentation, video event detection, anomaly detection, pedestrian tracking, and the like. Example use cases and applications are self-driving cars, video surveillance cameras and public safety, smart sensor networks, smart TV and smart advertisement, person re-identification, smart traffic monitoring, drones, and the like. Accordingly, when decoded data is consumed by machines, a quality metric for the decoded data may be defined, which may be different from a quality metric for human perceptual quality. Also, dedicated algorithms for compressing and decompressing data for machine consumption may be different than those for compressing and decompressing data for human consumption. The set of tools and concepts for compressing and decompressing data for machine consumption is referred to here as Video Coding for Machines.

It is likely that the receiver-side device include multiple 'machines' or neural networks (NNs). These multiple machines may be used in a certain combination which is for example determined by an orchestrator sub-system. The multiple machines may be used for example in succession, based on the output of the previously used machine, and/or in parallel. For example, a video which was compressed and then decompressed may be analyzed by one machine (NN) for detecting pedestrians, by another machine (another NN) for detecting cars, and by another machine (another NN) for estimating the depth of all the pixels in the frames.

Also, the term 'receiver-side' or 'decoder-side' to refer to the physical or abstract entity or device which includes one or more machines, and runs these one or more machines on some encoded and eventually decoded video representation which is encoded by another physical or abstract entity or device, the 'encoder-side device'.

The encoded video data may be stored into a memory device, for example as a file. The stored file may later be provided to another device.

Alternatively, the encoded video data may be streamed from one device to another.

Figure 3:
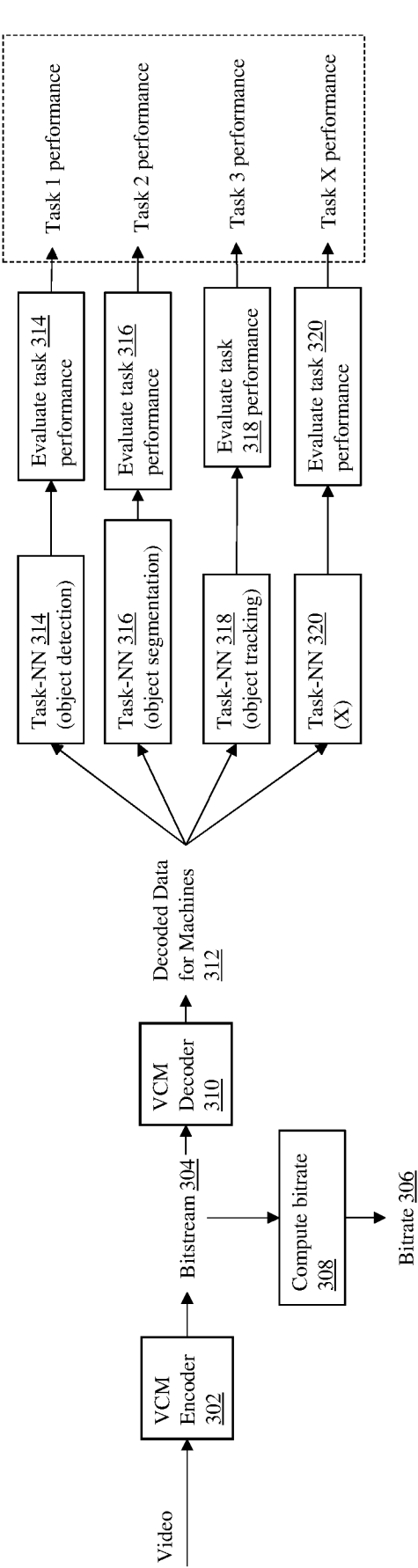
FIG. 3 illustrates a pipeline of video coding for machines (VCM).

FIG. 3 illustrates a pipeline of video coding for machines (VCM). A VCM encoder 302 encodes the input video into a bitstream 304. A bitrate 306 may be computed 308 from the bitstream 304 in order to evaluate the size of the bitstream 304. A VCM decoder 310 decodes the bitstream 304 output by the VCM encoder 302. An output of the VCM decoder 310 may be referred, for example, as decoded data for machines 312. This data may be considered as the decoded or reconstructed video. However, in some implementations of the pipeline of VCM, the decoded data for machines 312 may not have same or similar characteristics as the original video which was input to the VCM encoder 302. For example, this data may not be easily understandable by a human, when the human watches the decoded video from a suitable output device such as a display. The output of the VCM decoder 310 is then input to one or more task neural network (task-NN). For the sake of illustration, FIG. 3 is shown to include three example task-NNs, a task-NN 314 for object detection, a task-NN 316 for image segmentation, a task-NN 318 for object tracking, and a non-specified one, a task-NN 320 for performing task X. The goal of VCM is to obtain a low bitrate while guaranteeing that the task-NNs still perform well in terms of the evaluation metric associated with each task.

When a conventional video encoder, such as a H.266/VVC encoder, is used as a VCM encoder, one or more of the following approaches may be used to adapt the encoding to be suitable to machine analysis tasks:

One or more regions of interest (ROIs) may be detected. An ROI detection method may be used. For example, ROI detection may be performed using a task NN, such as an object detection NN. In some cases, ROI boundaries of a group of pictures or an intra period may be spatially overlaid and rectangular areas may be formed to cover the ROI boundaries. The detected ROIs (or rectangular areas, likewise) may be used in one or more of the following ways:

The quantization parameter (QP) may be adjusted spatially in a manner that ROIs are encoded using finer quantization step size(s) than other regions. For example, QP may be adjusted CTU-wise.

The video is preprocessed to contain only the ROIs, while the other areas are replaced by one or more constant values or removed.

A grid is formed in a manner that a single grid cell covers a ROI. Grid rows or grid columns that contain no ROIs are downsampled as preprocessing to encoding.

Quantization parameter of the highest temporal sublayer(s) is increased (i.e. coarser quantization is used) when compared to practices for human watchable video.

The original video is temporally downsampled as preprocessing prior to encoding. A frame rate upsampling method may be used as postprocessing subsequent to decoding, when machine analysis at the original frame rate is desired.

A filter is used to preprocess the input to the conventional encoder. The filter may be a machine learning based filter, such as a convolutional neural network.

Figure 4:
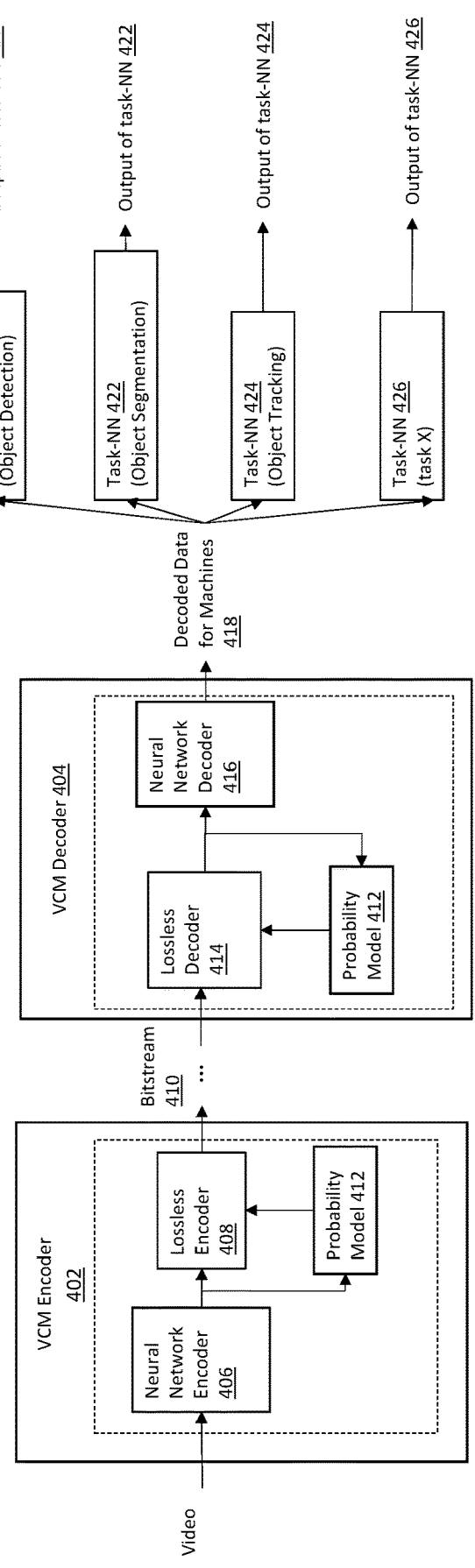
FIG. 4 illustrates an example of an end-to-end learned approach.

One of the possible approaches to realize video coding for machines is an end-to-end learned approach. FIG. 4 illustrates an example of an end-to-end learned approach. In this approach, the VCM encoder 402 and VCM decoder 404 mainly consist of neural networks. The following figure illustrates an example of a pipeline for the end-to-end learned approach. The video is input to a neural network encoder 406. The output of the neural network encoder 406 is input to a lossless encoder 408, such as an arithmetic encoder, which outputs a bitstream 410. The lossless codec may be a probability model 412, both in the lossless encoder 408 and in a lossless decoder 414, which predicts the probability of the next symbol to be encoded and decoded. The probability model 412 may also be learned, for example it may be a neural network. At a decoder-side, the bitstream 410 is input to the lossless decoder 414, such as an arithmetic decoder, whose output is input to a neural network decoder 416. The output of the neural network decoder 416 is the decoded data for machines, that may be input to one or more task-NNs, task-NN 420 for object detection, task 422 for image segmentation, task 424 for object tracking, and a non-specified one, task-NN 426 for performing task X.

Figure 5:
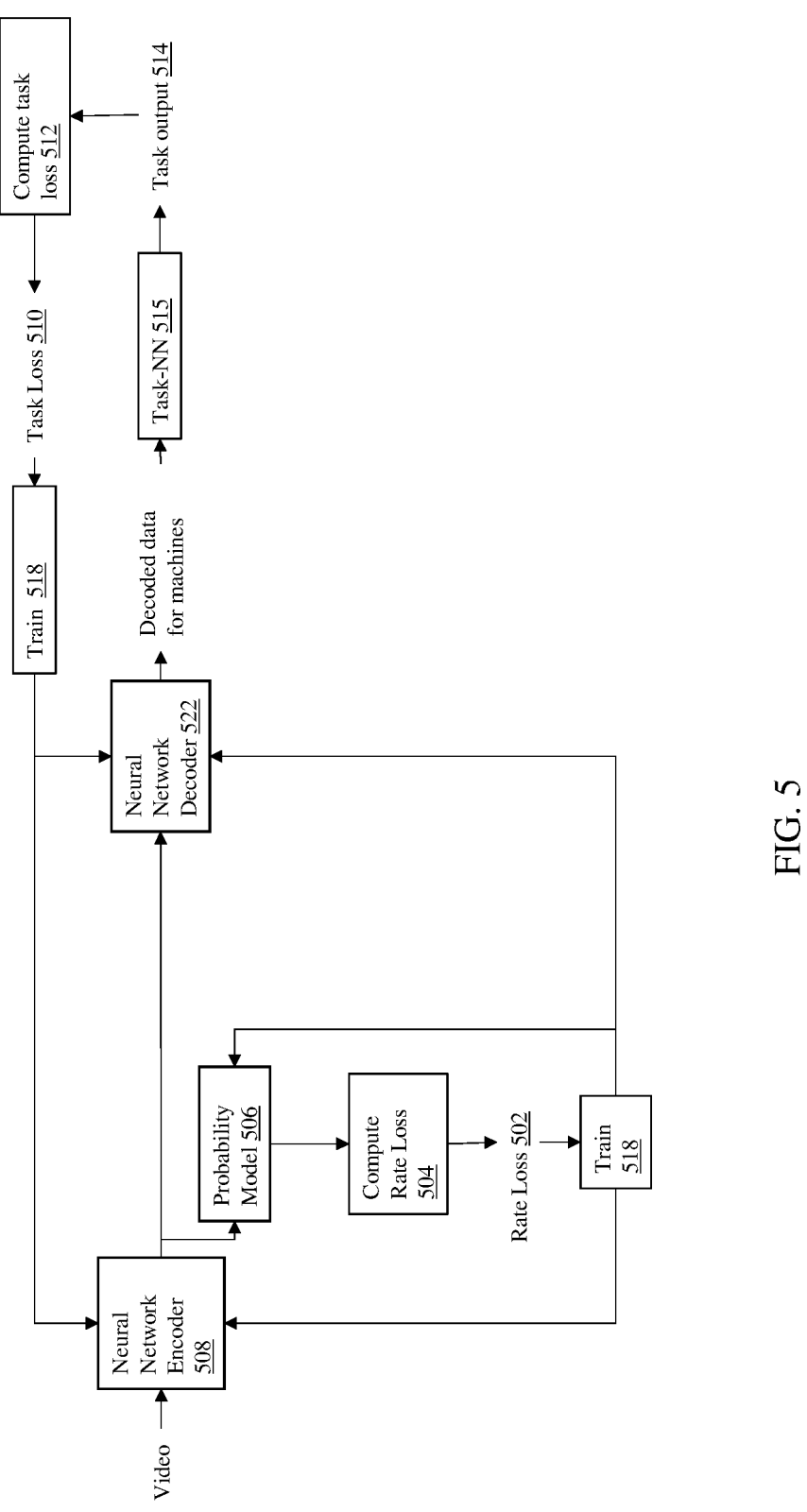
FIG. 5 illustrates an example of how the end-to-end learned system may be trained.

FIG. 5 illustrates an example of how the end-to-end learned system may be trained. For the sake of simplicity, only one task-NN is illustrated. However, it may be understood that multiple task-NNs may be similarly used in the training process. A rate loss 502 may be computed 504 from the output of a probability model 506. The rate loss 502 provides an approximation of the bitrate required to encode the input video data, for example, by a neural network encoder 508. A task loss 510 may be computed 512 from a task output 514 of a task-NN 516.

The rate loss 502 and the task loss 510 may then be used to train 518 the neural networks used in the system, such as a neural network encoder 508, probability model, a neural network decoder 522. Training may be performed by first computing gradients of each loss with respect to the neural networks that are contributing or affecting the computation of that loss. The gradients are then used by an optimization method, such as Adam, for updating the trainable parameters of the neural networks.

Another possible approach to realize video coding for machines is to use a video codec which is mainly based on more conventional components, that is components which are not obtained or derived by machine learning means. For example, H.266/VVC codec can be used. However, some of the components of such a codec may still be obtained or derived by machine learning means. In one example, one or more of the in-loop filters of the video codec may be a neural network. In another example, a neural network may be used as a post-processing operation (out-of-loop). A neural network filter or other type of filter may be used in-loop or out-of-loop for adapting the reconstructed or decoded frames in order to improve the performance or accuracy of one or more machine neural networks.

In some implementations, machine tasks may be performed at decoder side (instead of at encoder side). Some reasons for performing machine tasks at decoder side include, for example, the encoder-side device may not have the capabilities (computational, power, memory, and the like) for running the neural networks that perform these tasks, or some aspects or the performance of the task neural networks may have changed or improved by the time that the decoder-side device needs the tasks results (e.g., different or additional semantic classes, better neural network architecture). Also, there could be a customization need, where different clients would run different neural networks for performing these machine learning tasks.

Enabling Neural Network Based Intra Coding for Conventional Video Decoding

A framework allowing an end-to-end learned image compression (LIC) system to be used together with a conventional video compression (CVC) codec has been introduced. In such a framework, the LIC performs intra-frame coding and the CVC performs primarily inter-frame coding, where the LIC-decoded intra frame may be used as a reference frame in a CVC codec. While the description of the framework refers to frames, it needs to be understood that it could likewise be implemented to operate on spatial units smaller than a picture, such as a subpicture, slice, tile group, tile, block, and the like.

In various embodiments, a codec that includes at least a LIC codec and a CVC codec is referred to as a mixed learned and conventional (MLC) codec. The encoder of an MLC codec and the decoder of an MLC codec are referred to as MLC encoder and MLC decoder respectively. Also, in various embodiments, the terms 'frame' and 'picture' may be used interchangeably, to refer to an image, which may be part of a video. For example, a video comprises a sequence of images, frames, or pictures. A frame to be intra-coded may be referred to as an intra-frame, and a frame to be inter-coded may be referred to as an inter-frame.

Region of Interest Video Coding

When encoding an input video for a certain application or purpose, some regions in the input video may be more important than other regions. For example, in a surveillance system, the regions that contain human beings may be important for the application. A region of interest (ROI) may be referred to as a foreground region. A region that does not belong to regions of interest may be referred to as a background region. The foreground regions may be regions that contain certain classes of objects or regions that are considered salient. ROI-enabled video codec may encode an input video in a manner that foreground regions are reconstructed with high quality and background regions are reconstructed with low quality. It is to be understood that an ROI (even when referred to as a foreground region) may not need to be in the foreground of an image, for example, in terms of closeness to the camera capturing the image. For example, an ROI may comprise a region that is part of the background of an image, such as an object or region that is farther away from the camera capturing the image with respect to other objects or regions that are closer to the camera capturing the image. Thus, several criteria may be used for determining whether a region is an ROI, including (but not limited to) the following: absolute importance; relative importance with respect to other regions in the image; category or class of the object or region comprised in the ROI; absolute distance from the camera capturing the image; relative distance from the camera capturing the image.

Figures 6, 7:
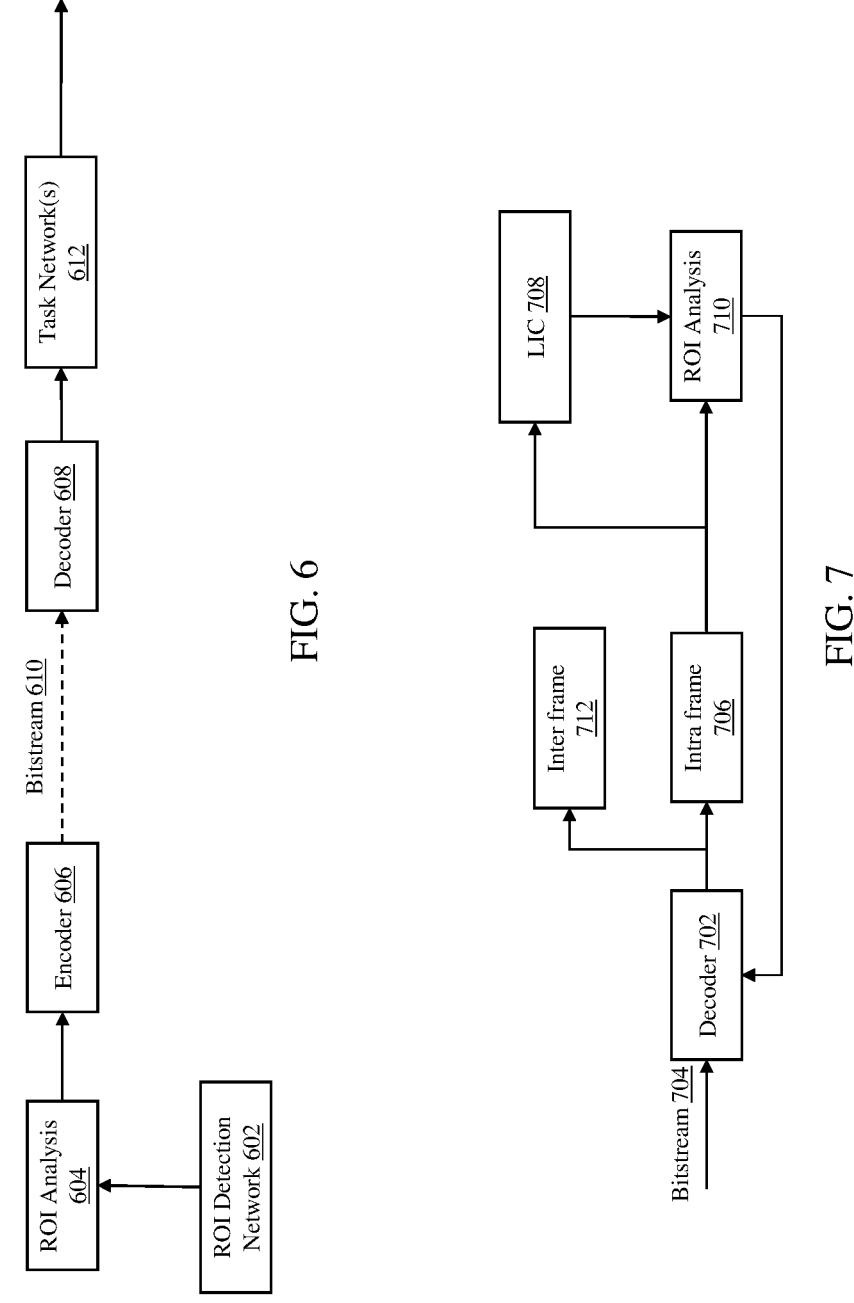
FIG. 6 illustrates an ROI-enabled video codec for machines, in accordance with an embodiment.
FIG. 7 illustrates some embodiments where ROI information is determined on a decoder side.

FIG. 6 illustrates an ROI-enabled video codec for machines, in accordance with an embodiment. In this embodiment, the foreground regions are detected using an ROI detection network 602. The ROI detection network 602 may be a computer vision task network, for example, an object detection or instance segmentation network. The input data may be processed or analyzed 604 using the ROI information and the processed data is passed to an encoder 606. The ROI information may be used to determine encoding parameters for the encoder 606. For example, a coding unit that falls into a foreground region may be encoded using a low quantization parameter, resulting in a high-quality reconstruction. While a coding unit that falls into a background region may be encoded using a high quantization parameter, resulting in a low-quality reconstruction.

The encoder may encode the ROI information and transfer the encoded ROI information to a decoder 608 in or along the bitstream 610. The decoder 608 may decode the received encoded ROI information and use the decoded ROI information to decode the bitstream 610 and output the reconstructed data. The reconstructed data may be consumed by humans or one or more task networks 612.

The ROI information may include, but is not limited to:
the coordinates and size of each foreground region;
a mask representation of the foreground and background regions;
semantic information about the foreground and/or background regions;
confidence of the semantic information about the foreground and/or background regions;
saliency information about the foreground and/or background regions.
The self-information or entropy of a region; an/or
A picture block partition position with respect to the top-left corner of the picture, and width and height dimensions of the block, and an indicator if the block contains the complete region of interest or part of the region of interest.

For a video codec, whether for human or machine consumption, the encoder may not have information about the semantic classes of the objects that the consumers on the decoder side are interested in. For example, in a VCM codec, the actual task network on the decoder side may be unknown to the encoder. Detecting foreground regions using an object detection or instance segmentation network for specific semantic classes may cause a mismatch of the interested regions between the codec and the machine tasks.

Therefore, the encoder may be required to determine generic important regions and encode the input data using the determined generic regions of interest for a wide variety of tasks.

In an MLC codec, intra-frames may be encoded using a neural network-based learned image codec (LIC), and inter-frames may be encoded using a conventional video codec (CVC). The LIC may be optimized for machine consumption, and the CVC may be optimized for human consumption. Thus, the reconstruction quality for the regions containing the same object in LIC-encoded intra-frames and CVC-encoded inter-frames may be different. This inconsistency in the decoded video may affect the visual satisfaction for humans or the performance of machine tasks.

Therefore, an MLC encoder may be required to detect generic important regions on inter-frames using the NN-based LIC codec and use the detected ROI regions to encode inter-frames.

Various embodiments describe using the NN-based LIC as an ROI detection network. The proposed method detects generic foreground regions that may be served to various machine tasks. The ROI information provided by the NN-based LIC may be used to determine encoding parameters, for example, quantization parameter, adjusting the quality of reconstructed video for conventional video codec and LICs.

The provided ROI information may also be used by a post-processing filter as auxiliary information to enhance the quality of the filtered output.

In some embodiments, the NN-based LIC in an MLC codec may detect foreground regions in reconstructed intra frames. The CVC decoder may use the detected foreground regions adjusted by the motion estimation to estimate one or more encoding parameters for inter frame encoding. The encoder may signal the residual of one or more encoding parameters in or along the bitstream to reduce the size of the bitstream. The decoder may determine one or more decoding parameters by combining the one or more estimated encoding parameters and the residual of the one or more encoding parameters to decode the inter frame.

Double Encoded Pictures

An input picture may be encoded twice using two different encoders or different encoding parameters of an encoder, generating two reconstructed pictures.

In one embodiment, an input picture is first encoded using an NN-based LIC to generate a first reconstructed picture. The first encoding may use a high QP value, resulting in a low-quality reconstruction, or may use a setting or configuration that causes the first reconstructed picture to comprise one or more first regions of higher quality than one or more second regions comprised in the first reconstructed picture. Next, the input picture is encoded using a CVC to generate a second reconstructed picture. The second encoding may use a QP value that matches the first encoding.

In another embodiment, an input picture is first encoded by an NN-based LIC using a setting that generates a low-quality reconstructed picture, for example, using a high QP value, or using a setting or configuration that causes the reconstructed picture to comprise one or more first regions of higher quality than one or more second regions comprised in the reconstructed picture. Next, the input picture is encoded by the LIC using a setting that generates a high-quality reconstructed picture, for example, using a low QP value.

Next, the first and the second reconstructed pictures may be partitioned into blocks. In one example, the blocks are of the same or substantially same size, e.g., 64×64. In another example, the blocks may be the same or substantially same as the CTU or the CU when the picture is encoded using a CVC. In another example, a super-pixel algorithm may be used to partition the input picture into non-rectangular blocks.

Next, for one or more block pairs in the first and the second reconstructed pictures, for example, the blocks at the same or substantially same location in the first and the second reconstructed pictures, the following may be performed:

compute a first quality measurement, for example, MSE, MAE, PSNR value, or a value derived from one or more of these metrics, of the first reconstructed picture with regard to the ground truth picture, resulting in measurement $x_1$;

compute a second quality measurement, for example, MSE, MAE, PSNR value, or a value derived from one or more of these metrics, of the second reconstructed picture with regard to the ground truth picture, resulting in measurement $x_2$; and calculate the difference between the first and the second measurement, e.g., $x_1-x_2$.

A block may be categorized as a background region when the difference value or the absolute value of the difference value is greater than a predefined threshold value. Otherwise, the block may be categorized as a foreground region.

In another example, the relative difference value, for example, $x_1-x_2/x_2$, or the absolute value of the relative difference value, may be used to determine whether a block is categorized as a foreground region or a background region. For example, a block may be categorized as a foreground region when the relative difference value is greater than a predefined threshold.

In another embodiment, the difference or relative difference of blocks from the first reconstructed picture and the second reconstructed picture may be measured in the feature domain. In this embodiment, a first set of feature maps may be derived from the first reconstructed picture using a proxy network. Next, a second set of feature maps may be derived from the second reconstructed picture using the proxy network. Next, the feature maps of the input picture may be derived from the input data. Quality measurements of a reconstructed picture may be the MSE, MAE, PSNR values, or a value derived from one or more of these metrics of the feature maps of the reconstructed picture with regard to the feature maps from the input data. A difference or relative difference value may be calculated from the quality measurements of corresponding blocks from the first set of feature maps and the second set of feature maps. When the difference value or relative difference value is greater than a predefined threshold value, the block may be categorized as a foreground region.

It is to be understood that in various embodiments, the categorization as a foreground region need not be a binary yes/no decision, but a value range may indicate a confidence and/or an importance level of a region.

In some embodiments, the quality measurement of a block may be calculated with regard to the quality measurement value of the whole frame or a region comprised in the frame that is bigger than the block. For example, let $x_1$ be the measurement of a block. Let x be the measurement of the whole reconstructed picture. The difference of the measurements $x_1-x$ may be used as the quality measurement of the block. In another example, the ratio of the two measurements, $x_1/x$, may be used as the quality measurement of the block.

In another embodiment, the pixel-domain or the feature-domain quality difference or relative difference is computed separately for each pixel of the frame, without averaging over all pixels in a block, thus obtaining a quality difference image. Then, regions of interest may be determined based on a post-processing operation applied to the quality difference image. For example, morphological operations (erosion and dilation) may be applied as part of the pre-processing operation.

Single Encoded Picture

In this embodiment, an input picture may be encoded using an NN-based LIC, deriving a reconstructed picture.

Next, the reconstructed pictures may be partitioned into blocks. In one example, the blocks are the same or substantially same size, e.g., 64×64. In another example, the blocks may be the same or substantially same as the CTU or the CU when the picture would have been encoded using a CVC. In another example, a super-pixel algorithm may be used to partition the input picture, resulting in a non-rectangular partition.

Next, for each block in the reconstructed picture, compute a quality measurement, for example, MSE, MAE, PSNR value, or a value derived from one or more of these metrics, of the first reconstructed picture with regard to the input picture, getting a measurement $x_1$. A block may be categorized as a background region when the quality measurement value is greater than a predefined threshold value. Otherwise, the block may be categorized as a foreground region.

In some embodiments, the quality measurement of the reconstructed picture is calculated in the feature domain. For example, a first set of feature maps may be derived from the reconstructed picture using a proxy network. Next, the feature maps of the input picture may be derived from the input data. Quality measurements of a reconstructed picture may be the MSE, MAE, PSNR values, or a value derived from one or more of these metrics, of the feature maps of the reconstructed picture with regard to the feature maps from the input data.

In some embodiments, the quality measurement of a block may be calculated with regard to the quality measurement value of the whole picture. For example, let $x_1$ be the measurement, such as MSE, MAE, or PSNR, of a block. Let x be the measurement of the reconstructed picture. The difference in the measurements $x_1-x$ may be used as the quality measurement of the block. In another example, the ratio of the two measurements, $x_1/x$, may be used as the quality measurement of the block.

Bits Allocation

In an embodiment, an input picture is first encoded using an NN-based LIC, deriving a bitstream and a reconstructed picture. The encoding may be performed to generate a low-quality reconstructed picture, for example, using a high QP value, or may be performed by using a setting or configuration that causes the reconstructed picture to comprise one or more first regions of higher quality than one or more second regions comprised in the reconstructed picture.

Next, the reconstructed pictures may be partitioned into blocks. In one example, the blocks are the same or substantially same size, such as 64×64. In another example, the blocks may be the same or substantially same as the CTU or the CU when the picture would have been encoded using a CVC. In another example, a super-pixel algorithm may be used to partition the input picture, resulting in a non-rectangular partition.

Next, for each block in the reconstructed picture, the length of the bits used to represent the block may be determined from the generated bitstream. The bits per pixel (BPP) may be calculated by dividing the length of the bits by the number of pixels in the block.

In one embodiment, a block may be categorized as a foreground region when the BPP of the block is greater than a predefined threshold. Otherwise, the block may be categorized as a background region.

In another embodiment, a relative BPP value is calculated by subtracting the BPP value of the reconstructed picture from the BPP value of a block. When the relative BPP value is greater than a predefined threshold value, the block may be categorized as a foreground region. Otherwise, the block may be categorized as a background region.

In yet another embodiment, a BPP ratio value is calculated by dividing the BPP of the block by the BPP of the reconstructed picture. When the BPP ratio value is greater than a predefined threshold value, the block may be categorized as a foreground region. Otherwise, the block may be categorized as a background region.

In another embodiment, an input picture may be first encoded by an NN-based LIC using a setting for high-quality reconstruction, for example, using a low QP value, generating a first reconstructed picture and a first bitstream. Next, the input picture may be encoded by the NN-based LIC using a setting for low-quality reconstruction, for example, using a high QP value, generating a second reconstructed picture and a second bitstream. In another embodiment, the second encoding may be performed using a CVC. When the second encoding is performed by a CVC, the settings for the first encoding and the second encoding may be chosen such that the size of the first bitstream is approximately the same as the size of the second bitstream. In another example, the settings for the first encoding and the second encoding may be chosen such that the quality of the first reconstructed picture is approximately the same as the quality of the second reconstructed picture. The quality measurement may be in the pixel domain or feature domain.

It is to be understood that, when an input picture is said to be encoded by a codec, such as an NN-based LIC, using a setting for low-quality reconstruction, such as using a high QP value, this may be include using, within the codec, a setting or configuration that causes the reconstructed picture(s) to comprise one or more first regions of higher quality than one or more second regions comprised in the reconstructed picture(s).

Next, the first and the second reconstructed pictures may be partitioned into blocks. In one example, the blocks are the same or substantially same size, e.g., 64×64. In another example, the blocks may be the same or substantially same as the CTU or the CU used in the second encoding. In another example, a super-pixel algorithm may be used to partition the input picture.

Next, for each block, BPP values or relative BPP values of the block in the first and the second reconstructed pictures are calculated. Next, the difference of the BPP values or the relative difference of the relative BPP values is calculated by subtracting the BPP value or the relative BPP value of the second reconstructed picture from the BPP value or the relative BPP value of the first reconstructed picture. For example, let $bpp_1$ be the BPP value of the block in the first reconstructed picture and $bpp_2$ be the BPP value of the block in the second reconstructed picture. The difference BPP value is calculated by $bpp_1-bpp_2$. The relative difference of the BPP value is calculated by $(bpp_1-bpp_2)/bpp_2$.

When the difference of the BPP value or the relative difference of the BPP value is greater than a predefined threshold value, the block may be categorized as a foreground region. Otherwise, the block may be categorized as a background region.

The criteria defined in various embodiments may be combined to determine whether a block is a foreground region or a background region. For example, a block may be categorized as a foreground region when the block satisfies two or more selected criteria. Otherwise, the block may be categorized as a background region. In another example, a block may be categorized as a foreground region when the majority of the selected criteria are satisfied. Otherwise, the block may be categorized as a background region.

In another embodiment, the encoder receives classification of foreground regions derived by any other embodiment. The encoder uses the classification for encoding an input frame with the CVC and/or with the LIC in a manner that the classification is used for spatially adaptive bit allocation or quantization parameter selection so that the foreground regions are represented by higher fidelity compared to the background.

ROI Determination on the Decoder Side

ROI information on the encoder side may be used to select different encoding parameters, for example, QP values, for different regions. One or more of the selected coding parameters may be transferred to the decoder side so the bitstream may be decoded correctly. This section describes various embodiments on determining the ROI information at the decoder side, which may, for example, reduce the size of the bitstream.

In an MLC codec, an intra frame may be encoded and decoded by an NN-based LIC. In one embodiment, ROIs may be determined by the quantization value of the encoded intra frame. The quantization value for a pixel in the latent representation may be derived from the quantization factor value associated with the pixel and the quantization value for the whole intra picture. For example, the difference between the quantization value of a pixel in the latent representation and the quantization value for the whole intra frame may be used to determine whether the pixel belongs to the foreground region. When the difference is greater than a predefined threshold value, the pixel may be categorized as a foreground pixel. In another example, the intra picture may be partitioned into blocks. When the difference between the average of the quantization values of the pixels in the latent representation corresponding to a block in the input picture and the quantization value for the whole input picture is greater than a predefined value, the block may be categorized as a foreground region. Otherwise, the block may be categorized as a background region.

When the inter frame is decoded, the ROI information detected from one or more decoded intra frames may be first processed using the motion compensation by the decoder. Motion compensation may be used to transfer detected foreground regions from one or more intra frames to inter frames. The processed ROI information may be used to estimate one or more decoding parameters, for example, QP values, for the CTUs and/or CUs and/or transform units (TUs). In another embodiment, the encoder may determine residuals of one or more decoding parameters, for example, QP values, and send said residuals or information about said residuals to the decoder. In another embodiment, a decoder receives residuals of one or more decoding parameters, for example, QP values, in or along a bitstream. The decoder may add the residual to the estimated one or more coding parameters to decode the received bitstream.

In an embodiment, an intra frame may be decoded by an NN-based LIC. The quantization value for a pixel in the latent representation may be derived from the quantization factor value associated with the pixel and the quantization value for the whole intra picture. A difference map, which may have a pre-defined granularity, or a granularity indicated by an encoder, is derived. For example, the difference between the quantization value of a pixel in the latent representation and the quantization value for the whole intra frame may be used in a difference map. In another example, the intra picture may be partitioned into blocks, a difference map may have a block granularity, and each block in the difference map may be set to the difference between the average of the quantization values of the pixels in the latent representation corresponding to a block in the input picture and the quantization value for the while intra frame. When an inter frame is decoded, the difference map detected from one or more decoded intra frames may be first processed using the motion compensation by the decoder. Motion compensation may be used to transfer detected difference values from one or more intra frames to inter frames. The transferred difference values may be used to estimate one or more decoding parameters, for example, QP values, for the CTUs and/or CUs and/or TUs. For example, when the difference indicates that the quantization of a block in a difference map has been finer than the quantization for the entire intra frame, the QP value of the block may be reduced. In another embodiment, a decoder receives residuals of one or more decoding parameters, for example, QP values, in or along a bitstream. The decoder may add the residual to the estimated one or more coding parameters to decode the received bitstream.

In another embodiment, one or more previously described embodiments on determining ROI information may be used by taking one or more decoded pictures as the input to an NN-based LIC. For example, a reconstructed intra picture may be encoded using an NN-based LIC and the foreground regions may be determined by the quality or relative quality of each block.

FIG. 7 illustrates some embodiments where ROI information is determined on a decoder 702 side. In this embodiment, the determined ROI information is used by the decoder 702 to decode one or more inter frames. The decoder 702 may receive a bitstream 704 and generate a decoded intra frame 706. The decoded intra frame 706 may be processed by LIC 708 to perform ROI analysis 710. The decoder 702 may receive the derived ROI information by the ROI analysis 710 and use the ROI information in decoding one or more inter frames 712.

In another embodiment, the detected ROI information at the decoder side may be used as auxiliary information for a post-processing filter or an in-loop filter. For example, the ROI mask may be given as an extra input to an NN-based post-processing filter or an in-loop filter.

In various embodiment, the terms 'machine vision', 'machine vision task', 'machine task', 'machine analysis', 'machine analysis task', 'computer vision', 'computer vision task', and 'task' may be used interchangeably.

In various embodiment, in this invention report, the terms 'machine consumption' and 'machine analysis' may be used interchangeably.

In various embodiment, the terms 'machine-consumable' and 'machine-targeted' may be used interchangeably.

In various embodiment, the terms 'human observation', 'human perception', 'displaying', 'displaying to human beings', 'watching', and 'watching by human beings' may be used interchangeably.

In various embodiment, the terms 'post-filter', 'post-processing filter' and 'postprocessing filter' may be used interchangeably.

FIG. 8 is an example apparatus 800, which may be implemented in hardware, caused to perform determining regions of interest using learned image codec for machines, based on the examples described herein. The apparatus 800 comprises at least one processor 802, at least one memory 804 including computer program code 805, wherein the at least one memory 804 and the computer program code 805 are configured to, with the at least one processor 802, cause the apparatus 800 to perform determining regions of interest using learned image codec for machines, based on the examples described herein.

The apparatus 800 optionally includes a display 808 that may be used to display content during rendering. The apparatus 800 optionally includes one or more network (NW) interfaces (I/F(s)) 810. The NW I/F(s) 810 may be wired and/or wireless and communicate over the Internet/other network(s) via any communication technique. The NW I/F(s) 810 may comprise one or more transmitters and one or more receivers. The N/W I/F(s) 810 may comprise standard well-known components such as an amplifier, filter, frequency-converter, (de)modulator, and encoder/decoder circuitry(ies) and one or more antennas.

The apparatus 800 may be a remote, virtual or cloud apparatus. The apparatus 800 may be either a coder or a decoder, or both a coder and a decoder. The at least one memory 804 may be implemented using any suitable data storage technology, such as semiconductor based memory devices, flash memory, magnetic memory devices and systems, optical memory devices and systems, fixed memory and removable memory. The at least one memory 804 may comprise a database for storing data. The apparatus 800 need not comprise each of the features mentioned, or may comprise other features as well. The apparatus 800 may correspond to or be another embodiment of the apparatus 50 shown in FIG. 1 and FIG. 2, any of the apparatuses shown in FIG. 3. The apparatus 800 may correspond to or be another embodiment of the apparatuses shown in FIG. 12, including UE 110, RAN node 170, or network element(s) 190.

FIG. 9 is an example method 900 to implement the examples described herein, in accordance with an embodiment. At 902, the method 900 includes encoding an input picture by using a first encoder or first encoding parameters. At 904, the method 900 includes encoding the input picture by using a second encoder or second encoding parameters. At 906, the method 900 includes generating a first reconstructed picture based on the encoding of the input picture by using the first encoder or the first encoding parameters. At 908, the method 900 includes generating a second reconstructed picture based on the encoding of the input picture by using the second encoder or the second encoding parameters.

In an embodiment, the first reconstructed picture is generated by using a neural network based learned image codec by using a high quantization parameters value, and wherein the second reconstructed picture is generated by using a conventional video codec.

In an embodiment, the method 900 may further include partitioning the first and the second reconstructed pictures into blocks.

Figure 12:
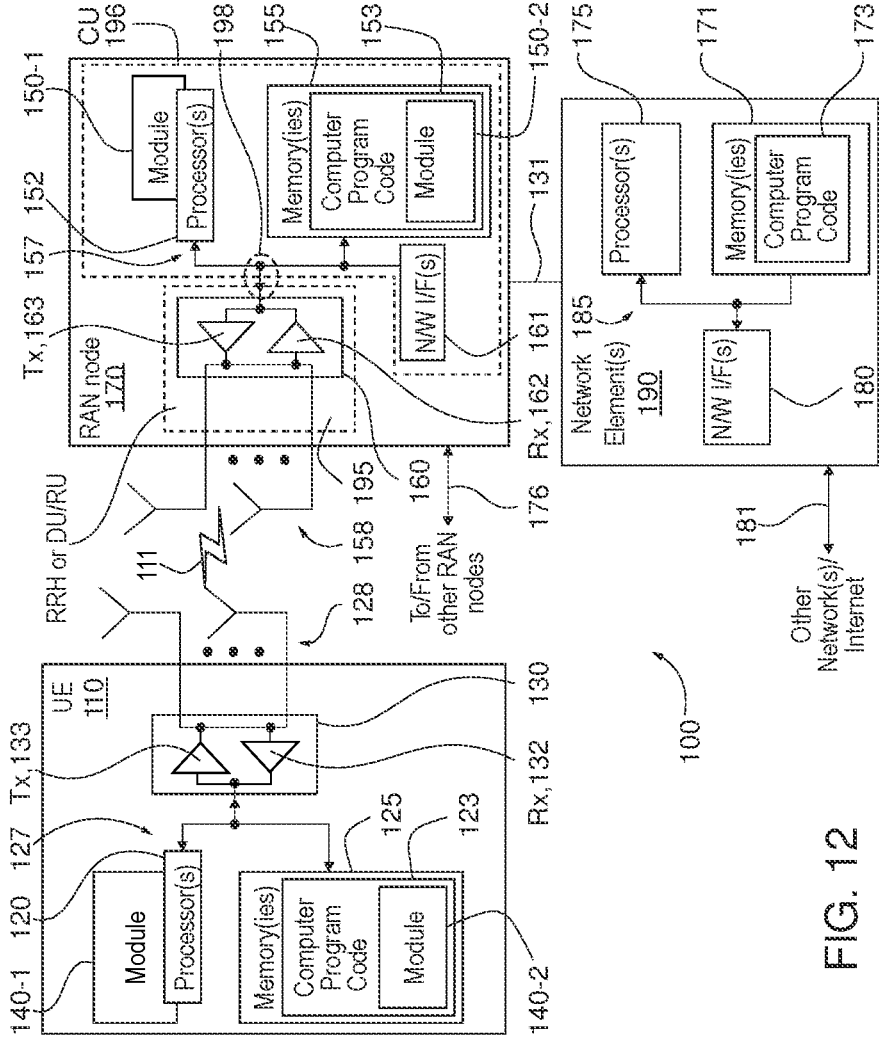
FIG. 12 is a block diagram of one possible and non-limiting system in which the example embodiments may be practiced.

The method 900 may be performed with an apparatus described herein, for example, the apparatus 50, 700, any apparatus of FIG. 12, or any other apparatus described herein.

Figure 10:
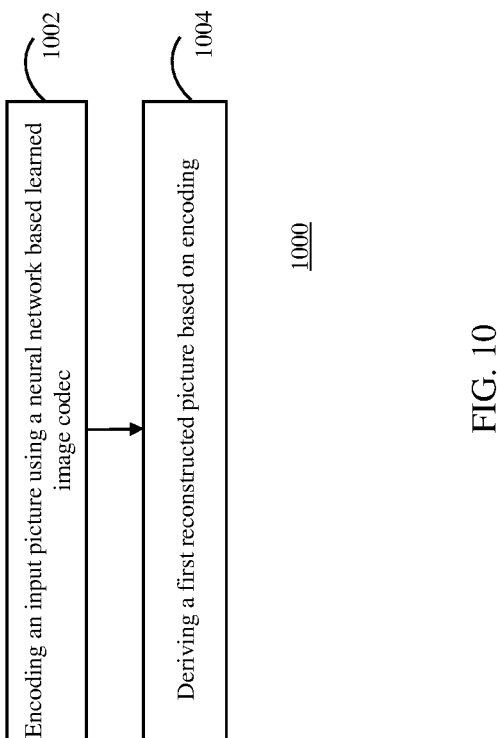
FIG. 10 is another example method to implement the embodiments described herein, in accordance with another embodiment.

FIG. 10 is an example method 1000 to implement the examples described herein, in accordance with an embodiment. At 1002, the method 1000 includes encoding an input picture using a neural network based learned image codec. At 1004, the method 1000 includes deriving a first reconstructed picture based on encoding.

In an embodiment, the method 1000 may further include partitioning the first reconstructed picture into blocks; for each block in the first reconstructed picture, computing a quality measurement of the reconstructed picture with regard to the input picture; categorizing a block as a background region when the quality measurement is greater than a threshold value; and/or categorizing the block as a foreground region when the quality measurement is lower than the threshold value. In an alternate embodiment, the example method 1000 may further include: categorizing a block as a background region when the quality measurement is greater than a threshold value; and/or categorizing the block as a foreground region when the quality measurement is lower than the threshold value.

The method 1000 may be performed with an apparatus described herein, for example, the apparatus 50, 700, any apparatus of FIG. 12, or any other apparatus described herein.

Figure 11:
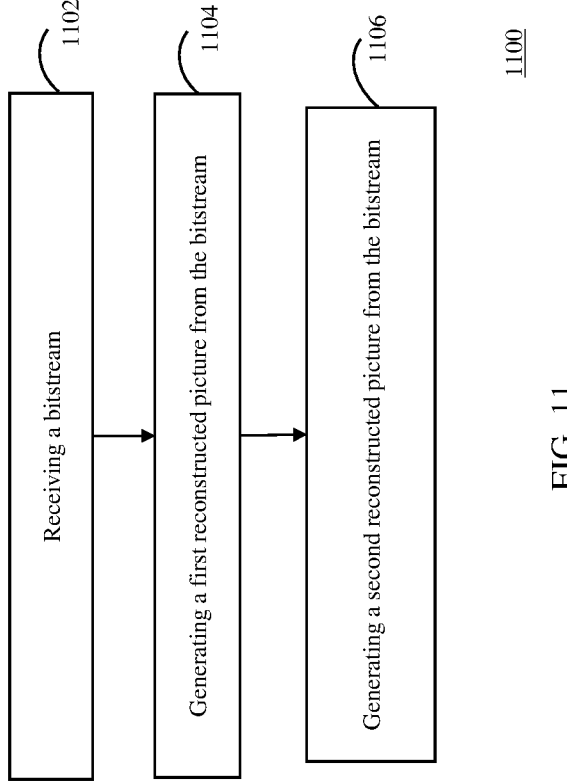
FIG. 11 is yet another example method to implement the embodiments described herein, in accordance with another embodiment.

FIG. 11 is an example method 1100 to implement the examples described herein, in accordance with an embodiment. At 1102, the method 1100 includes receiving a bitstream. At 1104, the method 1100 includes generating a first reconstructed picture from the bitstream. At 1106, the method 1100 includes generating a second reconstructed picture from the bitstream.

In an embodiment, the method 1100 may further include comprising determining a region of interest (ROI) based on a quantization value of the first reconstructed picture, wherein the first reconstructed picture comprises an intra frame.

The method 1100 may be performed with an apparatus described herein, for example, the apparatus 50, 700, any apparatus of FIG. 12, or any other apparatus described herein.

Referring to FIG. 12, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU)

of the RAN node 170 to the RRH/DU 195. Reference 198 also indicates those suitable network link(s).

It is noted that description herein indicates that 'cells' perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120,

152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to determine regions of interest using learned image codec for machines. Computer program code 173 may also be configured to determine regions of interest using learned image codec for machines.

As described above, FIGS. 9, 10, and 11 include flowcharts of an apparatus (e.g. 50, 900, or any other apparatuses described herein), method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, or 804) of an apparatus employing an embodiment of the present invention and executed by processing circuitry (e.g. 56, 120, or 802) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart(s) of FIGS. 9, 10, and 11. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

In the above, some example embodiments have been described with the help of syntax of the bitstream. It needs to be understood, however, that the corresponding structure and/or computer program may reside at the encoder for generating the bitstream and/or at the decoder for decoding the bitstream.

In the above, where example embodiments have been described with reference to an encoder, it needs to be understood that the resulting bitstream and the decoder have corresponding elements in them. Likewise, where example embodiments have been described with reference to a decoder, it needs to be understood that the encoder has structure and/or computer program for generating the bitstream to be decoded by the decoder.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, and the like.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Circuitry or Circuit: As used in this application, the term 'circuitry' or 'circuit' may refer to one or more or all of the following:

(a) hardware-only circuit implementations (such as implementations in only analog and/or digital circuitry); and (b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

What is claimed is:

1. An apparatus comprising at least one processor; and at least one memory storing instructions that, when executed by the at least one processor, cause the apparatus at least to perform:

encoding an input picture using a neural network based learned image codec; and deriving a first reconstructed picture based on encoding;

wherein the input picture is encoded by a neural network learned image codec by using a setting for high quality reconstruction to generate the first reconstructed picture and a first bitstream, and wherein the apparatus is further caused to perform:

encoding the input picture by using the neural network based learned image codec by using a setting for low-quality reconstruction;

generating a second reconstructed picture based on encoding;

generating a second bitstream based on the second reconstructed picture;

partitioning the second reconstructed picture into blocks;

calculating bits per pixel (BPP) values or relative BPP values of a block in the first reconstructed picture and the second reconstructed picture;

calculating a difference of BPP values or a relative difference of the relative BPP values by subtracting a BPP value or a relative BPP value of the second reconstructed picture from the BPP value or the relative BPP value of the first reconstructed picture; and categorizing the block as a foreground region when the difference of the BPP value or the relative difference of the BPP value is greater than a predefined threshold value and/or categorizing the block as a background region when the difference of the BPP value or the relative difference of the BPP value is smaller than the predefined threshold value.

2. The apparatus of claim 1, wherein the apparatus is further caused to perform:

partitioning the first reconstructed picture into blocks;

for each block in the first reconstructed picture, computing a quality measurement of the first reconstructed picture with regard to the input picture;

categorizing the block as a background region when the quality measurement is greater than a threshold value; and/or categorizing the block as a foreground region when the quality measurement is lower than the threshold value.

3. The apparatus of claim 2, wherein the quality measurement of the first reconstructed picture is calculated in a feature domain.

4. The apparatus of claim 1, wherein the apparatus is further caused to perform:

deriving or generating a first bitstream based on the first reconstructed picture; and determining a length of bits used to represent a block from the generated bitstream.

5. The apparatus of claim 4, wherein the apparatus is further caused to perform:

calculating bits per pixel (BPP) by dividing the length of bits by a number of pixels in the block;

categorizing the block as a foreground region when the BPP of the block is greater than a predefined threshold;

categorizing the block as a background region when the BPP of the block is smaller than the predefined threshold;

calculating a relative BPP of the block by subtracting a BPP value of the first reconstructed picture from the BPP value of the block;

categorizing the block as the foreground region when the relative BPP of the block is greater than the predefined threshold;

categorizing the block as the background region when the relative BPP of the block is smaller than the predefined threshold;

calculating a BPP ratio by dividing the BPP value of the block by a BPP of first reconstructed picture; and categorizing the block as the foreground region when the BPP ratio of the block is greater than the predefined threshold and/or categorizing the block as the background region when the BPP ratio of the block is smaller than the predefined threshold.

6. A method comprising:

encoding an input picture using a neural network based learned image codec; and deriving a first reconstructed picture based on encoding;

wherein the input picture is encoded by a neural network learned image codec by using a setting for high quality reconstruction to generate the first reconstructed picture and a first bitstream, and wherein the method further comprises:

encoding the input picture by using the neural network based learned image codec by using a setting for low-quality reconstruction;

generating a second reconstructed picture based on encoding;

generating a second bitstream based on the second reconstructed picture;

partitioning the second reconstructed picture into blocks;

calculating bits per pixel (BPP) values or relative BPP values of a block in the first reconstructed picture and the second reconstructed picture; and calculating a difference of BPP values or a relative difference of the relative BPP values by subtracting a BPP value or a relative BPP value of the second reconstructed picture from the BPP value or the relative BPP value of the first reconstructed picture;

categorizing the block as a foreground region when the difference of the BPP value or the relative difference of the BPP value is greater than a predefined threshold value and/or categorizing the block as a background region when the difference of the BPP value or the relative difference of the BPP value is smaller than the predefined threshold value.

7. The method of claim 6 further comprising:

partitioning the first reconstructed picture into blocks;

for each block in the first reconstructed picture, computing a quality measurement of the first reconstructed picture with regard to the input picture;

categorizing the block as a background region when the quality measurement is greater than a threshold value; and/or categorizing the block as a foreground region when the quality measurement is lower than the threshold value.

8. The method of claim 7, wherein the quality measurement of the first reconstructed picture is calculated in a feature domain.

9. The method of claim 6 further comprising:

deriving or generating a first bitstream based on the first reconstructed picture; and determining a length of bits used to represent a block from the generated bitstream.

10. The method of claim 9 further comprising:

calculating bits per pixel (BPP) by dividing the length of bits by a number of pixels in the block;

categorizing the block as a foreground region when the BPP of the block is greater than a predefined threshold;

categorizing the block as a background region when the BPP of the block is smaller than the predefined threshold;

calculating a relative BPP of the block by subtracting a BPP value of the first reconstructed picture from the BPP value of the block;

categorizing the block as the foreground region when the relative BPP of the block is greater than the predefined threshold;

categorizing the block as the background region when the relative BPP of the block is smaller than the predefined threshold;

calculating a BPP ratio by dividing the BPP value of the block by a BPP of first reconstructed picture; and categorizing the block as the foreground region when the BPP ratio of the block is greater than the predefined threshold and/or categorizing the block as the background region when the BPP ratio of the block is smaller than the predefined threshold.

11. An apparatus comprising at least one processor; and at least one memory storing instructions that, when executed by the at least one processor, cause the apparatus at least to perform:

receiving a first bitstream; and generating a first reconstructed picture from the first bitstream, wherein an input picture is encoded using a neural network based learned image codec, and wherein the first reconstructed picture is derived based on encoding;

wherein the input picture is encoded by a neural network learned image codec by using a setting for high quality reconstruction to generate the first reconstructed picture and the first bitstream, and wherein the input picture is encoded by using the neural network based learned image codec by using a setting for low-quality reconstruction to generate a second reconstructed picture, and wherein the apparatus is further caused to perform:

receiving a second bitstream comprising the second reconstructed picture;

generating the second reconstructed picture from the second bitstream;

partitioning the second reconstructed picture into blocks;

calculating bits per pixel (BPP) values or relative BPP values of a block in the first reconstructed picture and the second reconstructed picture;

calculating a difference of BPP values or a relative difference of the relative BPP values by subtracting a BPP value or a relative BPP value of the second reconstructed picture from the BPP value or the relative BPP value of the first reconstructed picture; and categorizing the block as a foreground region when the difference of the BPP value or the relative difference of the BPP value is greater than a predefined threshold value; and/or categorizing the block as a background region when the difference of the BPP value or the relative difference of the BPP value is smaller than the predefined threshold value.

12. The apparatus of claim 11, wherein the apparatus is further caused to perform:

partitioning the first reconstructed picture into blocks;

for each block in the first reconstructed picture, computing a quality measurement of the first reconstructed picture with regard to the input picture;

categorizing the block as a background region when the quality measurement is greater than a threshold value; and/or categorizing the block as a foreground region when the quality measurement is lower than the threshold value.

13. The apparatus of claim 12, wherein the quality measurement of the first reconstructed picture is calculated in a feature domain.

14. The apparatus of claim 11, wherein the apparatus is further caused to perform:

deriving or generating the first bitstream based on the first reconstructed picture; and determining a length of bits used to represent a block from the generated bitstream.

15. The apparatus of claim 14, wherein the apparatus is further caused to perform:

calculating bits per pixel (BPP) by dividing the length of bits by a number of pixels in the block;

categorizing the block as a foreground region when the BPP of the block is greater than a predefined threshold;

categorizing the block as a background region when the BPP of the block is smaller than the predefined threshold;

calculating a relative BPP of the block by subtracting a BPP value of the first reconstructed picture from the BPP value of the block;

categorizing the block as the foreground region when the relative BPP of the block is greater than the predefined threshold;

categorizing the block as the background region when the relative BPP of the block is smaller than the predefined threshold;

calculating a BPP ratio by dividing the BPP value of the block by a BPP of first reconstructed picture; and categorizing the block as the foreground region when the BPP ratio of the block is greater than the predefined threshold and/or categorizing the block as the background region when the BPP ratio of the block is smaller than the predefined threshold.

16. A method comprising:

receiving a first bitstream; and generating a first reconstructed picture from the first bitstream, wherein an input picture is encoded using a neural network based learned image codec, and wherein the first reconstructed picture is derived based on encoding;

wherein the input picture is encoded by a neural network learned image codec by using a setting for high quality reconstruction to generate the first reconstructed picture and the first bitstream, and wherein the input picture is encoded by using the neural network based learned image codec by using a setting for low-quality reconstruction to generate a second reconstructed picture, and wherein the method further comprises:

receiving a second bitstream comprising the second reconstructed picture;

generating the second reconstructed picture from the second bitstream;

partitioning the second reconstructed picture into blocks;

calculating bits per pixel (BPP) values or relative BPP values of a block in the first reconstructed picture and the second reconstructed picture;

calculating a difference of BPP values or a relative difference of the relative BPP values by subtracting a BPP value or a relative BPP value of the second reconstructed picture from the BPP value or the relative BPP value of the first reconstructed picture; and categorizing the block as a foreground region when the difference of the BPP value or the relative difference of the BPP value is greater than a predefined threshold value and/or categorizing the block as a background region when the difference of the BPP value or the relative difference of the BPP value is smaller than the predefined threshold value.

17. The method of claim 16 further comprising:

partitioning the first reconstructed picture into blocks;

for each block in the first reconstructed picture, computing a quality measurement of the first reconstructed picture with regard to the input picture;

categorizing the block as a background region when the quality measurement is greater than a threshold value; and/or categorizing the block as a foreground region when the quality measurement is lower than the threshold value.

* * * * *